(12) United States Patent
Pecora

(10) Patent No.: US 12,692,948 B2
(45) Date of Patent: Jul. 28, 2026

(54) VALVE GATES

(71) Applicant: ROMAC INDUSTRIES, INC., Bothell, WA (US)

(72) Inventor: Aaron David Pecora, Lynnwood, WA (US)

(73) Assignee: Romac Industries, Inc., Bothell, WA (US)

( * ) Notice: Subject to any disclaimer, the term of this patent is extended or adjusted under 35 U.S.C. 154(b) by 66 days.

(21) Appl. No.: 18/695,136

(22) PCT Filed: Sep. 21, 2022

(86) PCT No.: PCT/US2022/044271
§ 371 (c)(1),
(2) Date: Mar. 25, 2024

(87) PCT Pub. No.: WO2023/049194
PCT Pub. Date: Mar. 30, 2023

(65) Prior Publication Data
US 2025/0164013 A1 May 22, 2025

Related U.S. Application Data

(60) Provisional application No. 63/248,331, filed on Sep. 24, 2021.

(51) Int. Cl.
*F16K 3/18* (2006.01)
*F16L 55/105* (2006.01)
*F16L 55/124* (2006.01)

(52) U.S. Cl.
CPC ............ *F16K 3/184* (2013.01); *F16L 55/124* (2013.01); *F16L 55/105* (2013.01)

(58) Field of Classification Search
CPC ........ F16K 3/184; F16K 3/186; F16L 55/105; F16L 55/124
See application file for complete search history.

(56) References Cited

U.S. PATENT DOCUMENTS 5,074,526 A 12/1991 Ragsdale et al.
5,186,199 A 2/1993 Murphy et al.
(Continued)

FOREIGN PATENT DOCUMENTS

DE 202008014576 U1 * 2/2009 ............ F16L 55/124
EP 0952381 A2 10/1999
(Continued)

OTHER PUBLICATIONS

Machine English translation of DE-202008014576-U1 (Year: 2025).*
Machine English translation of JP_H07260015_A_I (Year: 2025).*
Machine English translation of KR-101762193-B1 (Year: 2025).*

*Primary Examiner* — Hailey K. Do

(74) *Attorney, Agent, or Firm* — Seed Intellectual Property Law Group LLP

(57) ABSTRACT

A valve gate may include a threaded rod, a nut engaged with the threaded rod, a movable body mounted on the threaded rod, a seal, a pair of levers, and first and second housing components that at least partially enclose the other components. The threaded rod can be turned to drive translation of the nut and the movable body along the threaded rod. Translation of the movable body along the threaded rod in a first direction can drive rotation of the levers outward away from the threaded rod, and rotation of the levers can force the seal to expand outward from the threaded rod. Translation of the movable body along the threaded rod in a second direction can drive rotation of the levers inward toward the threaded rod, and rotation of the levers can force the seal to contract inward toward the threaded rod.

14 Claims, 29 Drawing Sheets

(56)                    References Cited

U.S. PATENT DOCUMENTS

|  |  |  |  |
|---|---|---|---|
| 6,776,184 | B1 | 8/2004 | Maichel et al. |
| 6,810,903 | B1 | 11/2004 | Murphy et al. |
| 7,073,776 | B2 | 7/2006 | Mori |
| 7,225,827 | B2 | 6/2007 | Maichel et al. |
| 7,819,384 | B2 | 10/2010 | Nakano et al. |
| 8,627,843 | B2 | 1/2014 | Ries |
| 8,695,626 | B2 | 4/2014 | Murphy et al. |
| 9,644,779 | B2 | 5/2017 | Vazzana et al. |
| 9,829,141 | B2 | 11/2017 | Vazzana et al. |
| 10,619,747 | B2 | 4/2020 | Vazzana et al. |
| 2020/0309308 | A1 | 10/2020 | Naber et al. |

FOREIGN PATENT DOCUMENTS

| JP | H07260015 | * | 10/1995 | ............... | F16K 7/20 |
|---|---|---|---|---|---|
| JP | 2022029562 | A | 2/2022 | | |
| JP | 2022052014 | A | 4/2022 | | |
| KR | 101762193 | B1 * | 8/2017 | ............. | F16K 3/314 |

* cited by examiner

VALVE GATES

BACKGROUND

Technical Field

The present disclosure relates generally to valve gates configured to be used to seal pipes or other conduits, such as against the flow of water or other liquids, and more particularly to valve gates configured to be inserted into a pipe through an opening in an outer wall thereof.

Description of the Related Art

Fluidic valves, such as pneumatic or hydraulic valves, are very old technologies that are still being improved upon today. Many new pipeline systems are built with valves pre-installed therein, to allow operator(s) to control the flow of fluids through the various conduits thereof. In some cases, existing pipeline systems are updated or retrofitted to include additional, newer valves, to provide additional control options. In many cases, retrofitting existing municipal pipelines requires dewatering the pipeline, including shutting off water to a neighborhood and disinfecting the pipeline, before installation of new components such as valves can begin. Such dewatering operations can be expensive, time-consuming, and burdensome to those living in affected areas. Thus, live pipeline valve insertion, which allows a valve to be installed within a pipeline while the pipeline is operating (that is, without dewatering the pipeline) provides significant advantages.

Live pipeline valve insertion typically includes mounting a tapping sleeve over an existing live pipeline within which a valve is to be installed. Once the tapping sleeve has been properly mounted to the pipeline, additional components, such as cutting and/or reaming components, may be used within the tapping sleeve to create an opening or aperture in the pipeline suitable for installation of the valve. Once the opening has been formed, a valve including a valve gate may be positioned within the tapping sleeve and in proximity to the opening so that the valve gate can be inserted into the pipeline through the opening to seal or close the pipeline, and so that the valve gate can be retracted from the pipeline through the opening to un-seal or open the pipeline. Systems for live pipeline valve insertion are commercially available, such as from ROMAC INDUSTRIES, INC. under the names QUIKVALVE and INSERTAVALVE.

BRIEF SUMMARY

A valve gate may be summarized as comprising: a seal including an outer shell and an inner strap, wherein the inner strap is surrounded by the outer shell and the inner strap has a higher tensile stiffness or a higher tensile strength than the outer shell.

The valve gate may further comprise: a rod having a central longitudinal axis, a proximal end along the central longitudinal axis, and a distal end opposite the proximal end along the central longitudinal axis; a movable body coupled to the rod such that the movable body can move along a length of the rod; and a lever located between the rod and the seal and engaged with the movable body and a portion of the seal such that movement of the movable body along the length of the rod drives the lever to rotate and push the portion of the seal outward away from the rod in a direction transverse to the central longitudinal axis. The seal may have a first end coupled to the movable body, a second end opposite the first end coupled to the movable body, and an intermediate portion between the first and second ends that wraps around a distal end of the valve gate, and the inner strap may extend from the first end of the seal, through the intermediate portion of the seal, to the second end of the seal. The movable body may include a first undercut groove and a second undercut groove, wherein the outer shell of the seal includes a first hollow shaft at the first end of the seal and a second hollow shaft at the second end of the seal, wherein the first hollow shaft is securely retained within the first undercut groove of the movable body, and wherein the second hollow shaft is securely retained within the second undercut groove of the movable body.

The seal may include a first pin and a second pin, wherein the first pin is located within the first hollow shaft of the outer shell of the seal, wherein the second pin is located within the second hollow shaft of the outer shell of the seal, and wherein the first and second pins are more rigid than the outer shell of the seal. A first end of the inner strap may wrap around the first pin and a second end of the inner strap opposite the first end of the inner strap may wrap around the second pin. The first pin may have a first diameter larger than an opening of the first undercut groove and the second pin may have a second diameter larger than an opening of the second undercut groove.

A valve gate may be summarized as comprising: a rod having a central longitudinal axis, a proximal end along the central longitudinal axis, and a distal end opposite the proximal end along the central longitudinal axis; a movable body coupled to the rod such that the movable body can move along a length of the rod; a seal; a housing component that has an internal surface that faces toward the rod, the movable body, and the seal, wherein the internal surface of the housing component includes a guide; and a lever located between the rod and the seal and engaged with the movable body, the guide, and a portion of the seal such that movement of the movable body in a first direction along the length of the rod drives the lever to move and push the portion of the seal outward away from the rod in a direction transverse to the central longitudinal axis, and such that movement of the movable body in a second direction opposite to the first direction drives the lever to move and pull the portion of the seal inward toward the rod in the direction transverse to the central longitudinal axis.

The guide may include a groove and the lever may include a protrusion seated within the groove. The lever may be engaged with the movable body at a first end of the lever and the protrusion may be located at a second end of the lever opposite to the first end of the lever. The lever may include a groove and the guide may include a protrusion seated within the groove. The housing component may include a first wedge engaged with the lever and a second wedge engaged with the lever, wherein the first and second wedges are formed by the guide, and wherein the first and second wedges are separated by the guide. The lever may be directly connected to the seal. The seal may include an outer shell and an inner strap, wherein the inner strap is surrounded by the outer shell and the inner strap has a higher tensile stiffness or a higher tensile strength than the outer shell, and wherein the fastener mechanically secures the lever to the inner strap of the seal. The guide may extend from a first end of the guide a first distance from the rod and a second distance from the proximal end of the rod to a second end of the guide a third distance from the rod and a fourth distance from the proximal end of the rod, where the first distance is less than the third distance and the second distance is less than the fourth distance.

A valve gate having a central longitudinal axis, a proximal end along the central longitudinal axis, and a distal end opposite the proximal end along the central longitudinal axis, may be summarized as comprising: a first housing portion including a first protrusion extending radially outward from an outer surface of the first housing portion with respect to the central longitudinal axis; and a second housing portion including a second protrusion extending radially outward from an outer surface of the second housing portion with respect to the central longitudinal axis; wherein the valve gate is configured such that, when the valve gate is inserted through a tapping sleeve into a pipeline carrying a pressurized fluid, the pressurized fluid exerts a pressure against the first portion of the housing, thereby causing a radially-outermost end of at least one of the protrusions to bear against an internal surface of the tapping sleeve, thereby restraining movement of the valve gate such that the pressure exerted against the first portion of the housing bends the valve gate about a location where the valve gate engages with the pipeline.

The valve gate may be configured such that exertion of the pressure against the first housing portion causes a radially-outermost end of the first protrusion to bear against the internal surface of the tapping sleeve, thereby restraining movement of the valve gate such that the pressure exerted against the first housing portion bends the valve gate about a location where the second housing portion engages with the pipeline. The first protrusion may extend radially outward from a proximal-most end of the first housing portion and the second protrusion may extend radially outward from a proximal-most end of the second housing portion. The first protrusion may extend radially outward from the outer surface of the first housing portion farther than any other component of the valve gate and the second protrusion may extend radially outward from the outer surface of the second housing portion farther than any other component of the valve gate.

DETAILED DESCRIPTION

In the following description, certain specific features are set forth in order to provide a thorough understanding of various embodiments of the invention. However, one skilled in the art will understand that the invention may be practiced with a subset of such features or with any desired combination of such features.

Figure 1:
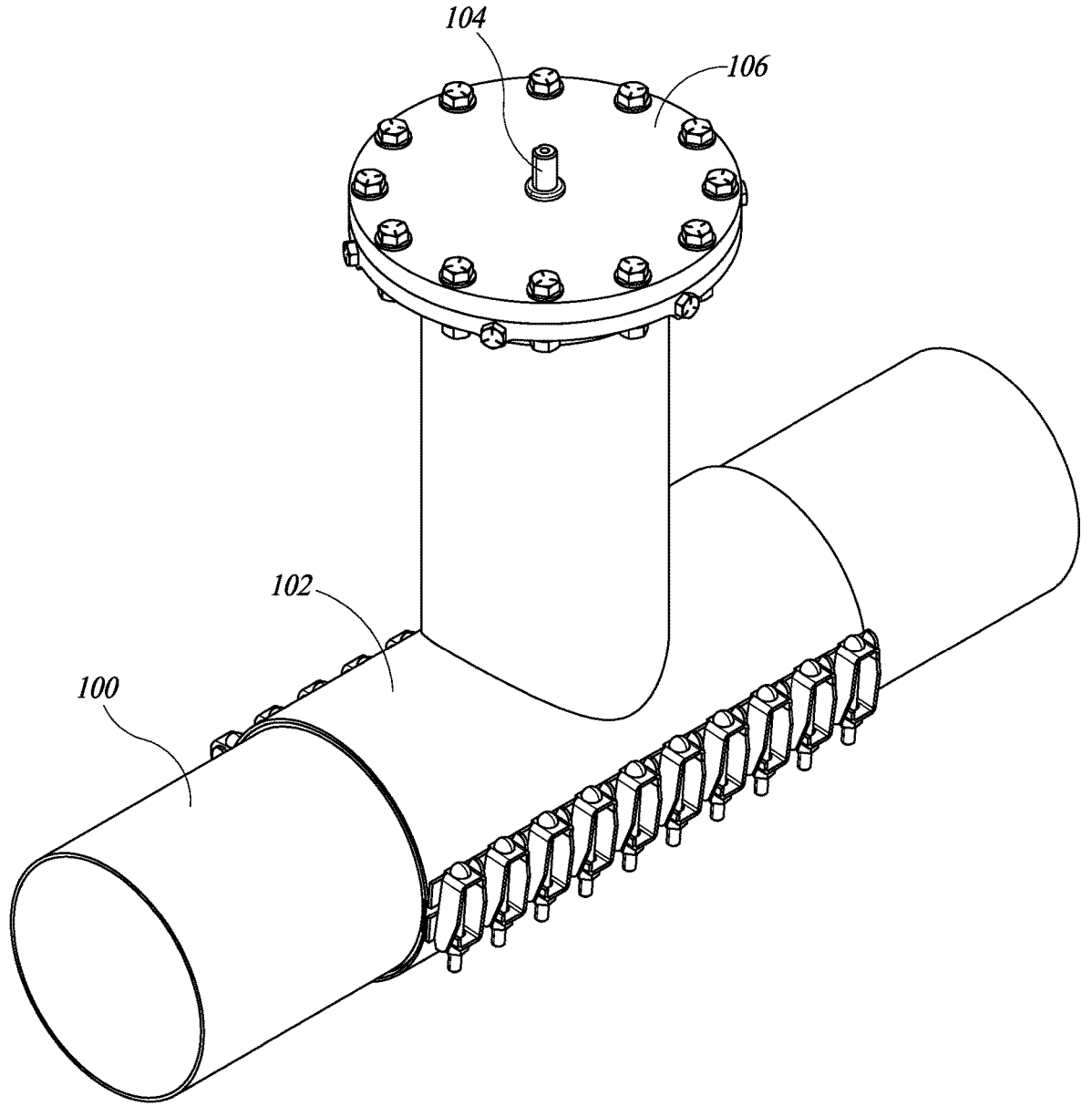
FIG. 1 illustrates a perspective view of a valve gate installed within a tapping sleeve mounted to a pipeline.
Figure 2:
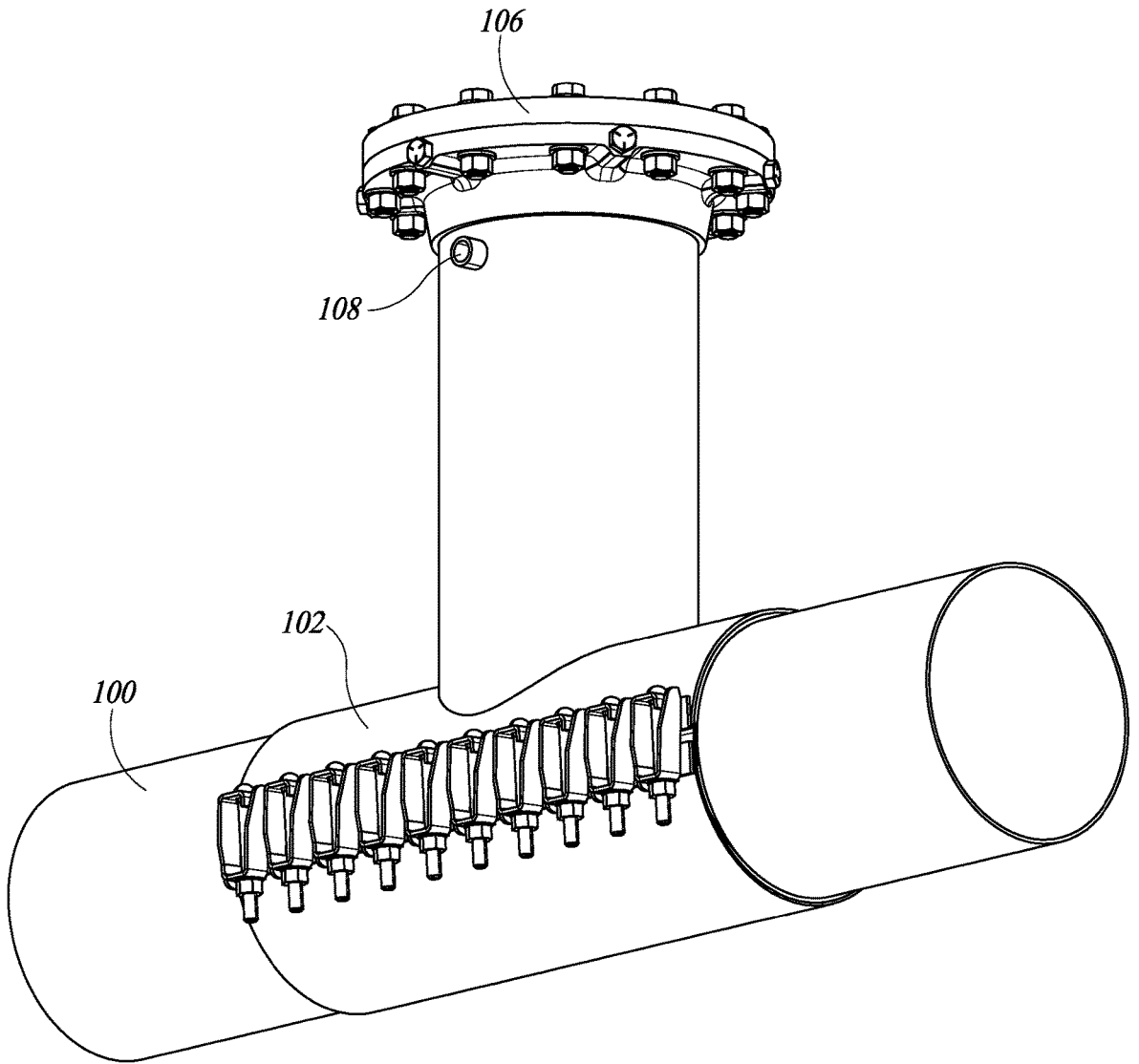
FIG. 2 illustrates another perspective view of the valve gate installed within the tapping sleeve mounted to the pipeline illustrated in FIG. 1.
Figure 3:
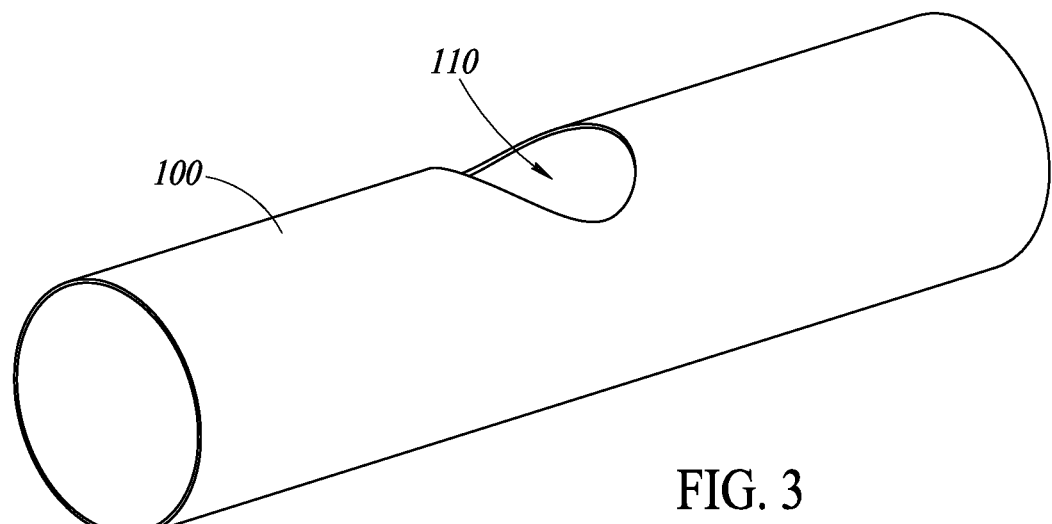
FIG. 3 illustrates a perspective view of the pipeline shown in FIGS. 1 and 2 with other components, including the valve gate and tapping sleeve, removed.
Figure 4:
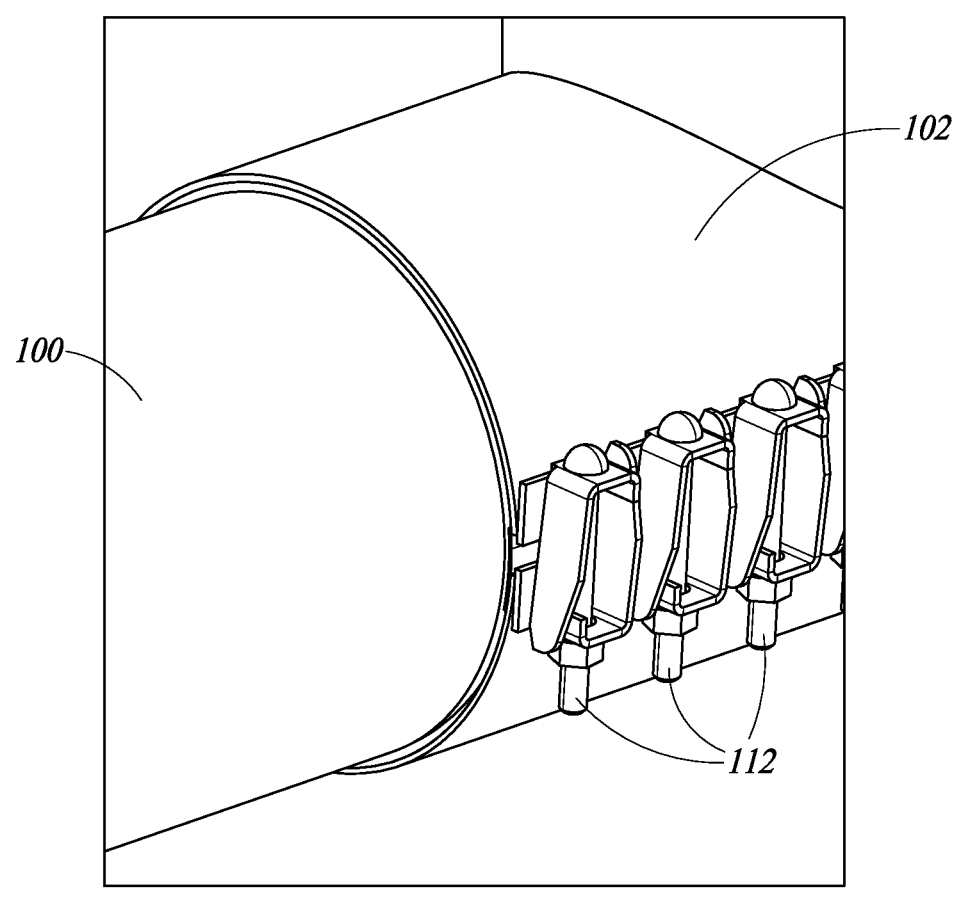
FIG. 4 illustrates a perspective view of a portion of the tapping sleeve and the pipeline shown in FIGS. 1 and 2 at a larger scale.

FIG. 1 illustrates a pipeline 100 and a tapping sleeve 102 mounted to and installed on the pipeline 100. FIG. 1 also illustrates that an uppermost portion of a valve gate 104 protrudes outward through a flange 106 at a terminal end portion of the tapping sleeve 102 distal from the pipeline 100. FIG. 2 illustrates another view of the pipeline 100 and tapping sleeve 102, and shows that the tapping sleeve 102 includes a port 108 through which fluids such as liquids or gases can be provided to or removed from an interior of the tapping sleeve 102, such that, for example, fluid pressures within the tapping sleeve 102 can be controlled (e.g., increased or decreased) by moving fluids into or out of the tapping sleeve 102 through the port 108. FIG. 3 illustrates the pipeline 100 by itself and shows that an aperture, hole, or opening 110 has been cut into and formed within an outer wall of the pipeline 100. FIG. 4 illustrates a portion of the pipeline 100 and the tapping sleeve 102 at a larger scale, showing a portion of a mechanism that securely couples the tapping sleeve 102 to the pipeline 100.

As illustrated in FIGS. 1-4, the pipeline 100 has an opening 110 formed in an outer wall thereof, through which the valve gate 104 can be moved. For example, the valve gate 104 can be moved toward and into the pipeline 100 through the opening 110 to seal and close the pipeline 100 at the location of the opening 110, and the valve gate 104 can be moved away from and out of the pipeline 100 through the opening 110 to un-seal and open the pipeline 100 at the location of the opening 110. As illustrated in FIG. 3, the pipeline 100 has a hollow cylindrical shape that has a central longitudinal axis, and the opening 110 has a circular shape with its own central longitudinal axis that is perpendicular to the central longitudinal axis of the pipeline 100. Thus, the resulting three-dimensional shape of the edge or periphery of the opening 110 forms a saddle shape defined by the geometry (including the diameter) of both the pipeline 100 and the opening 110.

As illustrated in FIG. 3, a diameter of the opening 110 is substantially smaller than an inner diameter of the pipeline 100. It may be advantageous to make the diameter of the opening 110 as small as feasible, and as much smaller than the inner diameter of the pipeline 100 as feasible, under the circumstances. For example, in some cases it is easier, less expensive, and less time-consuming to form a smaller opening than a larger opening in the pipeline 100. As another example, cutting an opening into the wall of the pipeline 100 generally weakens the pipeline 100 at the location of the opening 110, and a smaller opening 110 generally reduces the overall strength of the pipeline 100 at the location of the opening 110 by less than a larger opening would. As one further example, making the opening 110 smaller leaves more of the inner surface of the pipeline 100 intact and available for the valve gate 104 to engage with and form a seal with. In practice, however, the diameter of the opening 110 will be driven by the size of the valve gate 104 to be inserted through the opening 110. For example, a single valve gate 104 may be configured for use with pipelines 100 of different diameters. In such cases, even though the pipelines 100 have different diameters, an opening 110 in any one of the pipelines 100 may have the same size, to accommodate the dimensions of the single valve gate 104.

As also illustrated in FIGS. 1-4, the tapping sleeve 102 includes a plurality of bolts or other mechanical fasteners 112 that couple an upper portion of the tapping sleeve 102 (i.e., a portion of the tapping sleeve 102 that extends away from the pipeline 100, which may also be referred to herein as a front portion of the tapping sleeve 102) to a lower portion of the tapping sleeve (i.e., a portion of the tapping sleeve 102 opposite to the upper or front portion thereof, which may also be referred to herein as a rear portion of the tapping sleeve 102). As illustrated in FIG. 4, the fasteners 112 may include bolts that can be tightened to couple the tapping sleeve 102 to the pipeline 100 and increase a pressure exerted by the tapping sleeve 102 on the outer surface of the pipeline 100, which improves a fluid seal, such as a gaseous and/or liquid seal, between an inner surface of the tapping sleeve 102 and the outer surface of the pipeline 100, and that can be loosened to decrease a pressure exerted by the tapping sleeve 102 on the outer surface of the pipeline 100 and to de-couple the tapping sleeve 102 from the pipeline 100. In some embodiments, the fasteners 112 may replaced and/or supplemented with welds. That is, the upper portion of the tapping sleeve 102 may be welded to the pipeline 100.

Figure 5:
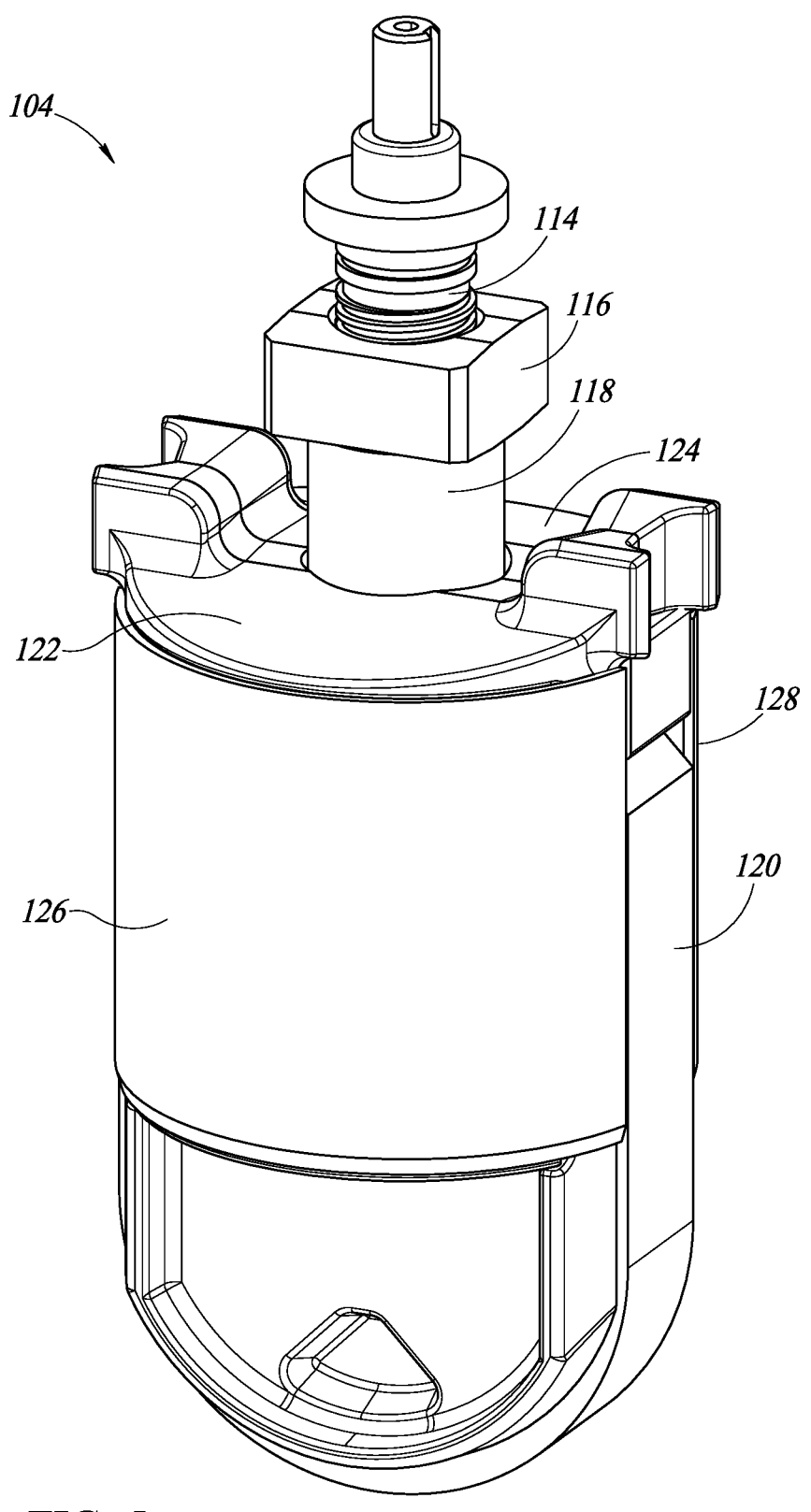
FIG. 5 illustrates a perspective view of a valve gate.
Figure 6:
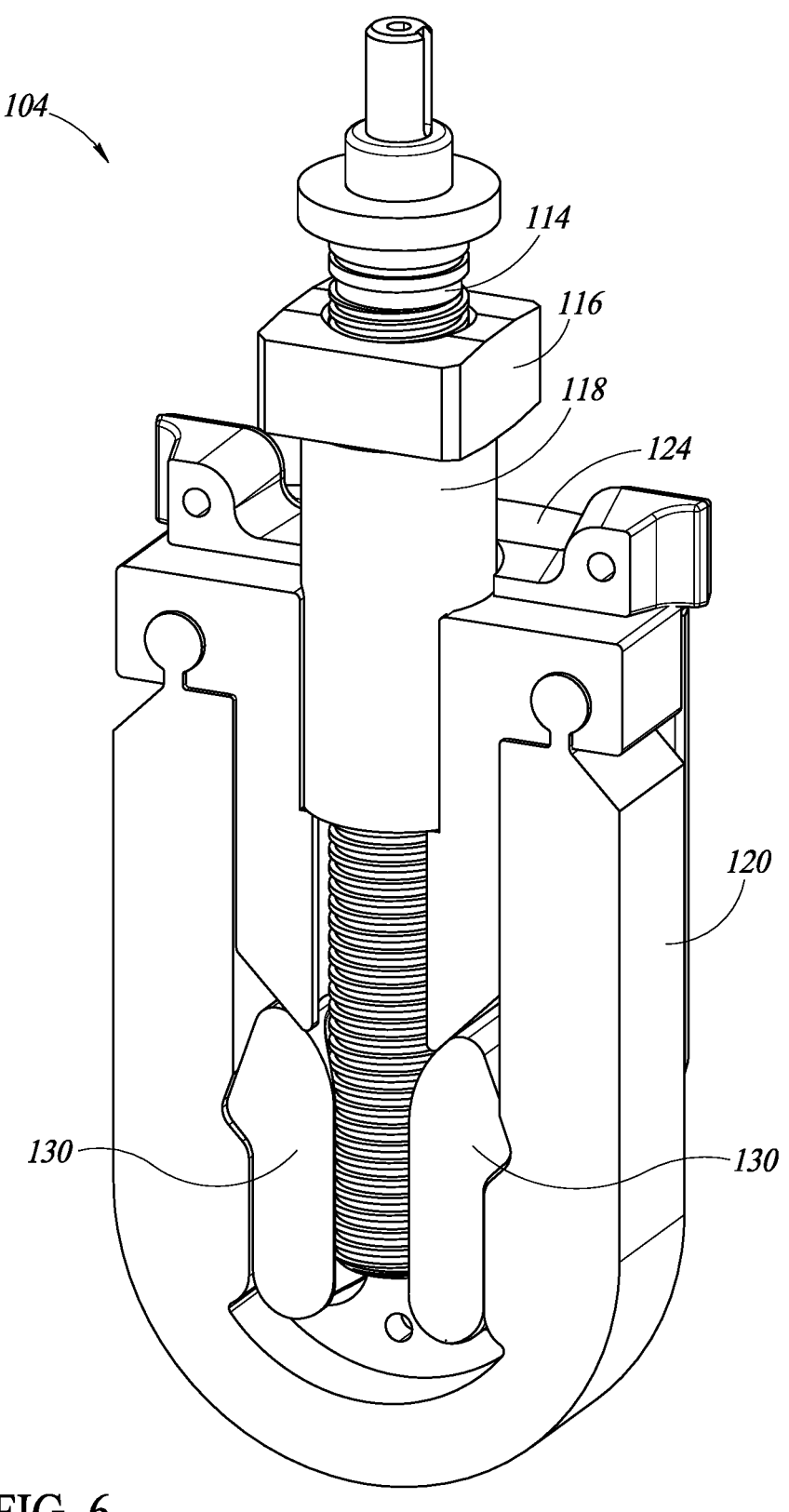
FIG. 6 illustrates a perspective view of the valve gate of FIG. 5 with seal components and a portion of a housing removed.
Figure 7:
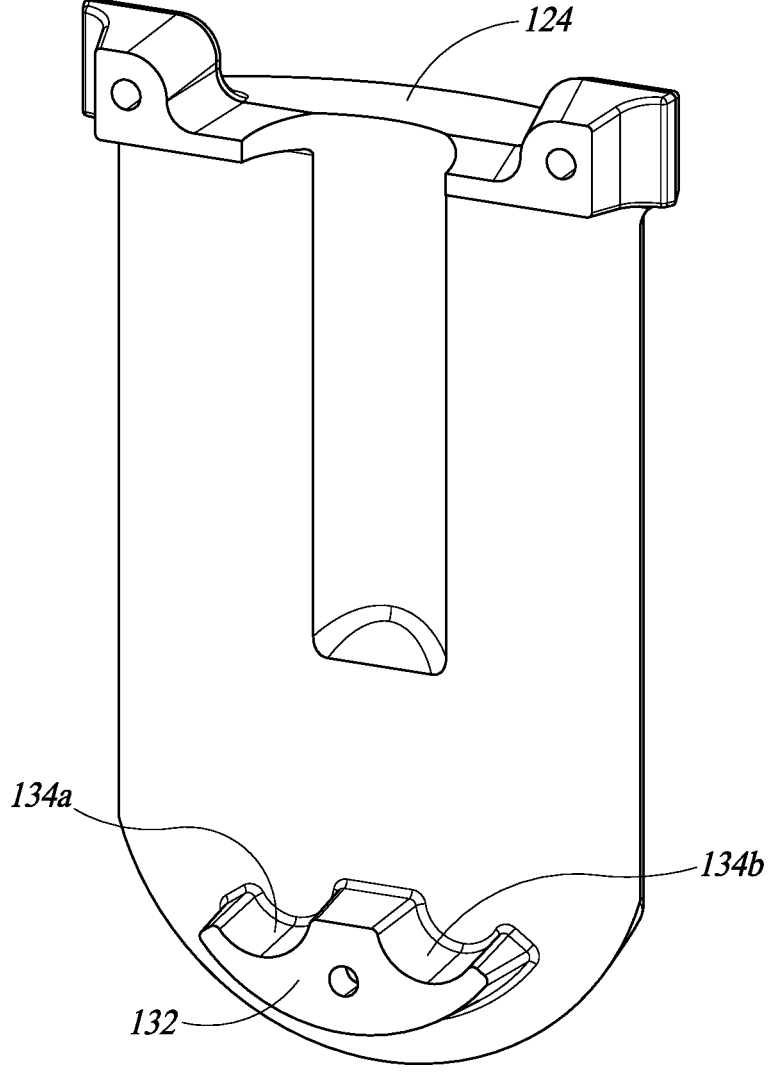
FIG. 7 illustrates a perspective view of a portion of a housing of the valve gate of FIG. 5.

FIGS. 5-14 illustrate additional features of the valve gate 104. For example, FIGS. 5-7 illustrate various features of the valve gate 104 from a single consistent perspective view. In particular, FIG. 5 illustrates all components of the valve gate 104 in an assembled state, while FIGS. 6 and 7 each illustrate less than all components of the valve gate 104 so that additional features are revealed. As illustrated in FIG. 5, the valve gate 104 includes a threaded rod 114, a threaded square nut 116, a spacer or load transfer or movable body 118, a first seal 120, a first housing component or portion of a housing 122, which may be an upstream portion of a housing 122, a second housing component or portion of a housing 124, which may be a downstream portion of a housing 124, a second seal 126, which may be an upstream seal 126, and a third seal 128, which may be a downstream seal 128.

While some components of the valve gate 104 are referred to herein as "upstream" or "downstream" components, the valve gate 104 can, in practice, be used to seal the pipeline 100 in either direction, e.g., such that components of the valve gate referred to as "upstream" components are in fact located upstream with respect to a direction of fluid flow through the pipeline 100 or such that components of the valve gate referred to as "upstream" components are in fact located downstream with respect to a direction of fluid flow through the pipeline 100, and such that components of the valve gate referred to as "downstream" components are in fact located upstream with respect to a direction of fluid flow through the pipeline 100, or such that components of the valve gate referred to as "downstream" components are in fact located downstream with respect to a direction of fluid flow through the pipeline 100.

When the valve gate 104 is inserted into the pipeline 100 through the opening 110, the first seal 120 can be pushed outward from the rest of the valve gate 104, as described further elsewhere herein, until it engages with a radially- and inwardly-facing inner surface of the pipeline 100 to engage the valve gate 104 with the pipeline 100 and create a seal between the valve gate 104 and the pipeline 100. Thus, when the valve gate 104 is inserted into the pipeline 100 and viewed along the central longitudinal axis of the pipeline 100, the upstream and downstream seals 126, 128 form front and rear portions of the valve gate 104 and the first seal 120 forms an outer peripheral portion of the valve gate 104, and outward movement of the first seal 120 to engage with the inner surface of the pipeline 100 is generally radial movement of portions of the first seal 120.

Furthermore, when the valve gate 104 is inserted into the pipeline 100 and viewed along a central longitudinal axis of the threaded rod 114, which may be coincident with the central longitudinal axis of the opening 110 formed in the pipeline 100, the upstream and downstream seals 126, 128 form outer peripheral portions of the valve gate 104 such that the valve gate 104 has a generally circular outer peripheral shape, for example with a first, upstream semi-circular portion thereof formed by the outer peripheral surface of the upstream seal 126, and a second, downstream semi-circular portion thereof formed by the outer peripheral surface of the downstream seal 128. This generally circular outer peripheral shape of the valve gate 104 and the upstream and downstream semi-circular portions thereof can have shapes and dimensions configured to engage with and seat snugly against the inner surface formed by the opening 110 in the pipeline 100.

For example, the semi-circular outer peripheral shape of the upstream seal 126 when viewed along the central longitudinal axis of the threaded rod 114 may have a diameter or a radius of curvature that matches, corresponds to, or is the same as a diameter or a radius of curvature of the opening 110 when it is viewed along the central longitudinal axis of the threaded rod 114, and the semi-circular outer peripheral shape of the downstream seal 128 when viewed along the central longitudinal axis of the threaded rod 114 may have a diameter or a radius of curvature that matches, corresponds to, or is the same as a diameter or a radius of curvature of the opening 110 when it is viewed along the central longitudinal axis of the threaded rod 114. Furthermore, a length of the upstream seal 126 in a direction aligned with or parallel to the central longitudinal axis of the threaded rod 114 is at least as long as an overall height of the three-dimensional saddle shape of the opening 110 in a direction aligned with or parallel to the central longitudinal axis of the threaded rod 114, and a length of the downstream seal 128 in a direction aligned with or parallel to the central longitudinal axis of the threaded rod 114 is at least as long as an overall height of the three-dimensional saddle shape of the opening 110 in a direction aligned with or parallel to the central longitudinal axis of the threaded rod 114.

Thus, when the valve gate 104 is inserted into the pipeline 100 through the opening 110, the upstream seal 126 can engage with and create a seal against an upstream portion of the inner surface formed by the opening 110, and the downstream seal 128 can engage with and create a seal against a downstream portion of the inner surface formed by the opening 110. In practice, when the valve gate 104 is inserted into the pipeline 100 to seal the pipeline, the fluid within the pipeline 100 exerts a pressure against the valve gate 104 that urges or biases the valve gate 104 in a downstream direction and toward the downstream portion of the inner surface formed by the opening 110. Thus, a seal formed between the upstream seal 126 and the upstream portion of the inner surface formed by the opening 110 has different characteristics than a seal formed between the downstream seal 128 and the downstream portion of the inner surface formed by the opening 110.

In some cases, as an example, no seal is formed at all on the upstream side of the valve gate 104, as the fluid pressure makes forming such a seal more difficult or complicated but assists in forming a seal on the downstream side of the valve gate 104. Thus, in some implementations, the upstream seal 126 has different properties, such as different dimensions or different material properties, than the downstream seal 128. In some implementations, the upstream seal 126 is larger than and/or made of different material(s) than the downstream seal 128. In some implementations, the upstream seal 126 may be omitted from the valve gate 104 entirely such that no seal is formed during operation between the valve gate 104 and the upstream portion of the inner surface formed by the opening 110.

FIG. 6 illustrates the valve gate 104 with the upstream and downstream seals 126, 128, and the upstream portion of the housing 122 removed such that additional features of the valve gate 104, such as of the threaded rod 114, the nut 116, the movable body 118, the first seal 120, and a pair of levers 130 thereof are shown. FIG. 7 illustrates the downstream portion of the housing 124 by itself and shows that the downstream portion of the housing 124 includes a protrusion 132 that extends inwardly and in an upstream direction from an inner or upstream surface of the downstream portion of the housing 124.

As illustrated in FIG. 7, when the valve gate 104 is located within the pipeline 100 and the downstream portion of the housing 124 and the protrusion 132 are viewed along the central longitudinal axis of the pipeline 100, the protrusion 132 includes a pair of sockets 134a, 134b, each of which includes a curved bearing surface. In particular, when viewed along the central longitudinal axis of the pipeline 100, the first socket 134a is spaced apart from the central longitudinal axis of the threaded rod 114 by a first distance in a first direction, and the second socket 134b is spaced apart from the central longitudinal axis of the threaded rod 114 by a second distance, which may be the same as the first distance, in a second direction, which may be opposite to the first direction. Each of the sockets 134a, 134b includes a bearing surface that extends linearly in a direction along a respective axis aligned with or parallel to the central longitudinal axis of the pipeline 100, and that is curved about such respective axes. Thus, each of the sockets 134a, 134b forms a respective channel or cup oriented to face upward toward the nut 116 when the valve gate 104 is assembled. Each of the sockets 134a, 134b can form a respective fulcrum for a respective one of the levers 130 when the valve gate 104 is assembled and in use, as described further elsewhere herein. In some embodiments, the levers 130 may be mounted in the sockets 134a, 134b on axles.

The upstream portion of the housing 122 may include a protrusion that extends inwardly and in a downstream direction from an inner or downstream surface of the upstream portion of the housing 122, and that is complementary to or a mirror image of the protrusion 132. When the valve gate 104 is located within the pipeline 100 and the upstream portion of the housing 122 and its protrusion are viewed along the central longitudinal axis of the pipeline 100, the protrusion includes a pair of sockets complementary to and/or mirror images of the sockets 134a, 134b, and each of which includes a curved bearing surface. In particular, when viewed along the central longitudinal axis of the pipeline 100, a first socket of the protrusion of the upstream portion of the housing 122 is spaced apart from the central longitudinal axis of the threaded rod 114 by a first distance in a first direction (which may be the same as the first distance and first direction, respectively, described with respect to the protrusion 132), and a second socket of the protrusion of the upstream portion of the housing 122 is spaced apart from the central longitudinal axis of the threaded rod 114 by a second distance, which may be the same as the first distance, in a second direction, which may be opposite to the first direction (and which may be the same as the second distance and second direction, respectively, described with respect to the protrusion 132). Each of the sockets of the protrusion of the upstream portion of the housing 122 includes a bearing surface that extends linearly in a direction along a respective axis aligned with or parallel to the central longitudinal axis of the pipeline 100, and that is curved about such respective axes. Thus, each of the sockets of the protrusion of the upstream portion of the housing 122 forms a respective channel or cup oriented to face upward toward the nut 116 when the valve gate 104 is assembled. Each of the sockets of the protrusion of the upstream portion of the housing 122 can form a respective fulcrum for a respective one of the levers 130 when the valve gate 104 is assembled and in use, as described further elsewhere herein. In some embodiments, the levers 130 may be mounted in the sockets of the protrusion of the upstream portion of the housing 122 on axles.

Figure 8:
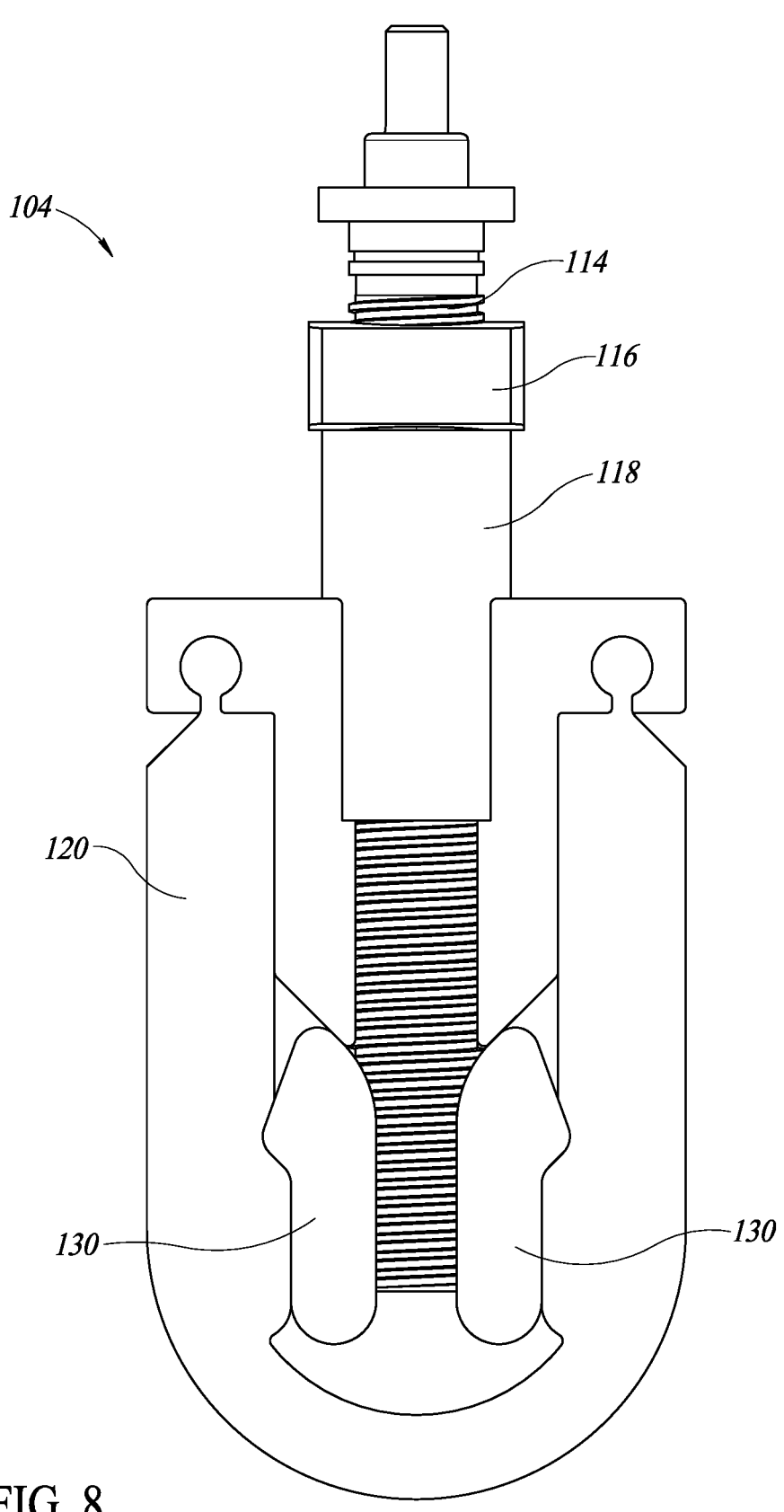
FIG. 8 illustrates a front view of the valve gate of FIG. 5 with a seal and two portions of a housing removed.
Figure 9:
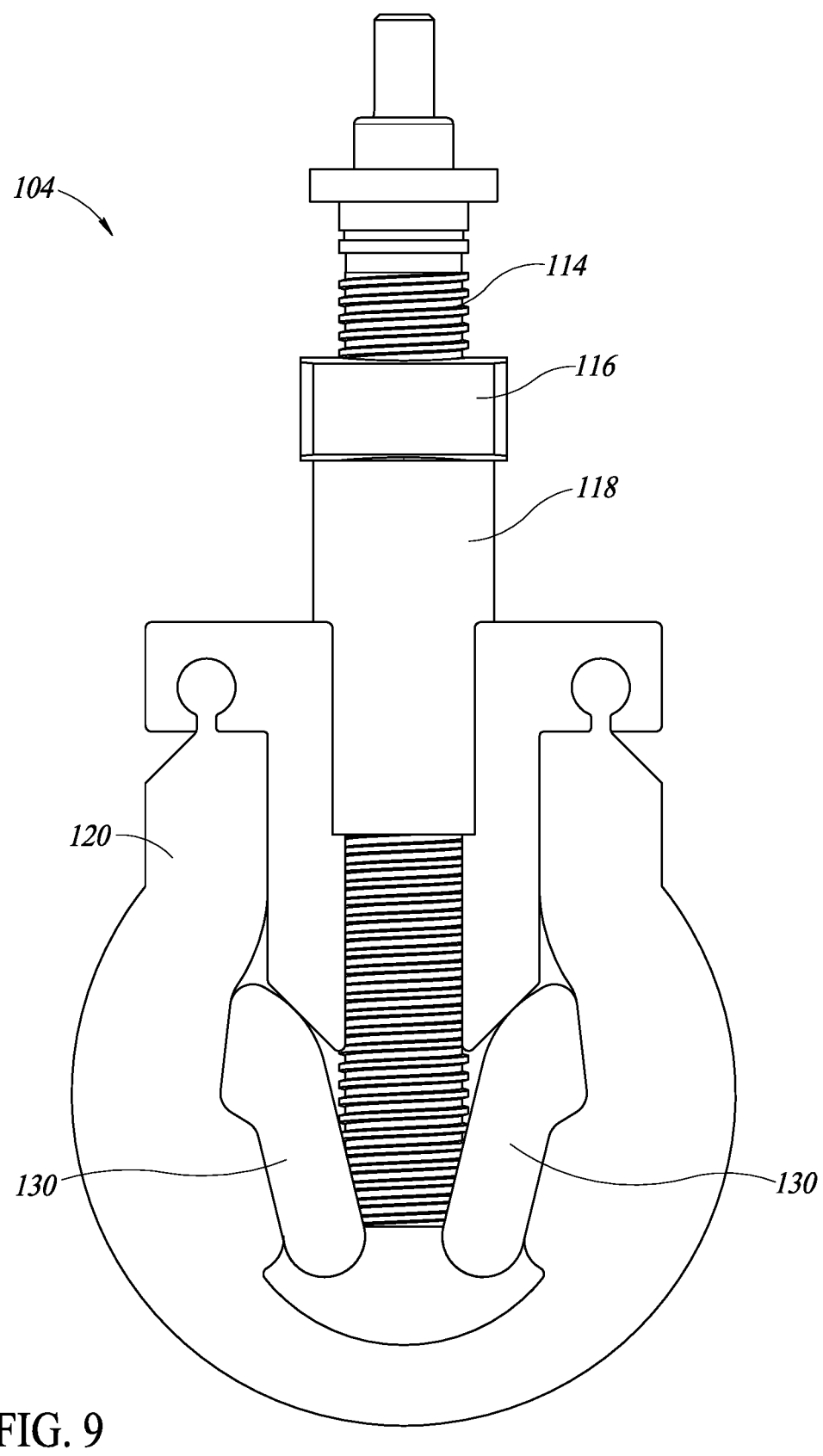
FIG. 9 illustrates a front view of the valve gate of FIG. 5 with a seal and two portions of a housing removed, where the valve gate is in an expanded configuration.
Figure 10:
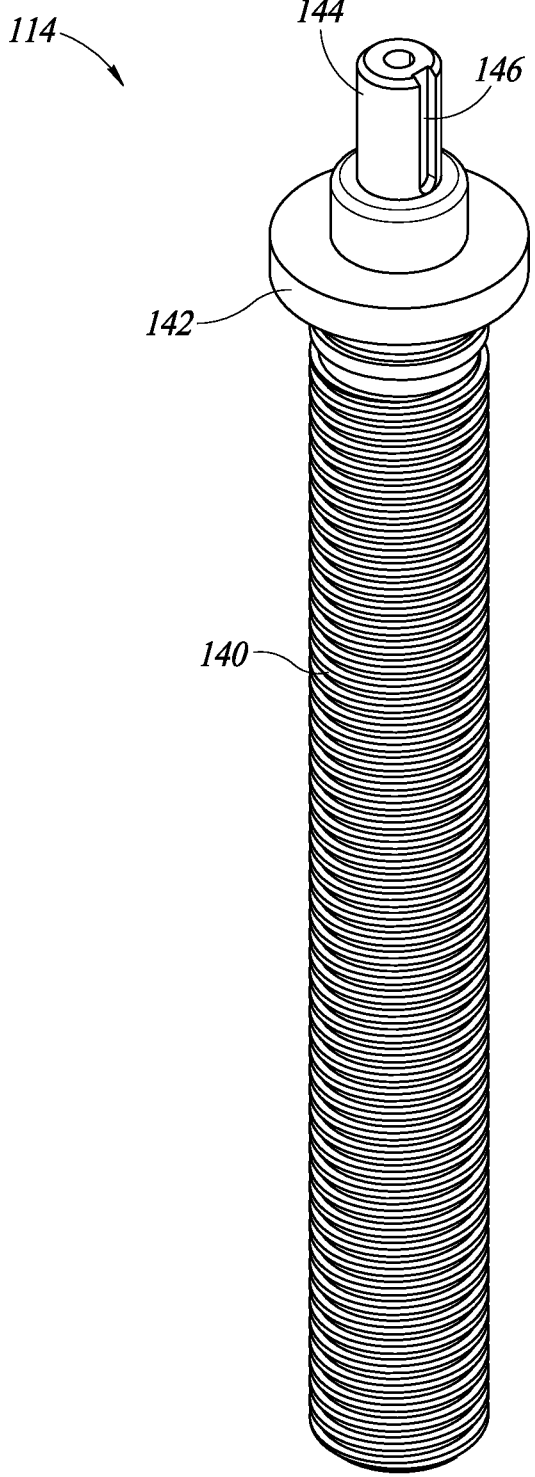
FIG. 10 illustrates a perspective view of a threaded rod of the valve gate of FIG. 5.

FIG. 8 illustrates a front view of the valve gate 104 with the upstream portion of the housing 122, the downstream portion of the housing 124, the upstream seal 126, and the downstream seal 128 removed such that other features of the valve gate 104, such as of the threaded rod 114, the nut 116, the movable body 118, the first seal 120, and the pair of levers 130 are shown. FIG. 9 illustrates a front view of the valve gate 104 similar to that of FIG. 8, but in a radially-expanded configuration. FIG. 10 illustrates the threaded rod 114 by itself such that additional features thereof are revealed. As illustrated in FIG. 10, the threaded rod 114 includes a cylindrical and threaded main body 140 that extends along the central longitudinal axis of the threaded rod 114, a flange 142 that extends radially outward from the central longitudinal axis of the threaded rod 114, and a terminal end portion 144 that includes a groove or keyway 146 that is cut radially inward into the terminal end portion 144 and extends longitudinally along the length of the terminal end portion 144 in a direction aligned with or parallel to the central longitudinal axis of the threaded rod 114.

As illustrated in FIG. 1, the threaded rod 114 can be positioned within the tapping sleeve 102 such that the flange 142 is inside the tapping sleeve 102. In various embodiments, the flange 142 is retained such that it cannot travel along the central longitudinal axis of the threaded rod 114, but such that it can rotate about the central longitudinal axis of the threaded rod 114, and therefore such that the entire threaded rod 114 cannot travel along its own central longitudinal axis but can rotate about its own central longitudinal axis. As further illustrated in FIG. 1, the threaded rod 114 can be positioned within the tapping sleeve 102 such that its terminal end portion 144 and the keyway 146 thereof extend outside of the tapping sleeve 102. Thus, by engaging other device(s) with the terminal end portion 144 of the threaded rod 114, including with the keyway 146 thereof, an operator can actuate the threaded rod 114, such as to rotate about its own central longitudinal axis. While the threaded rod 114 described and illustrated herein includes the keyway 146 for engaging other devices with the terminal end portion 144 of the threaded rod 114, in other implementations, the threaded rod 114 may include other features, such as a spline or a square taper, for engaging other devices with the terminal end portion 144 of the threaded rod 114.

Figure 11:
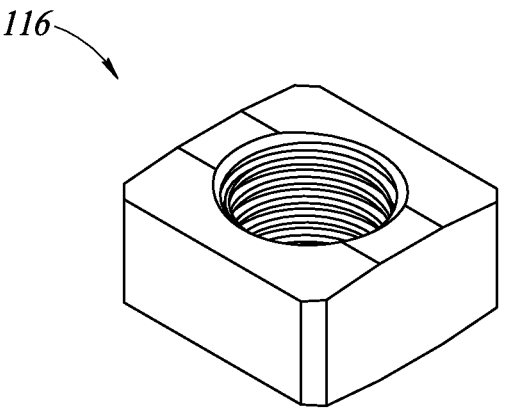
FIG. 11 illustrates a perspective view of a threaded square nut of the valve gate of FIG. 5.

FIG. 11 illustrates the threaded square nut 116 by itself such that additional features thereof are revealed. The threaded square nut can have an internal bore that is threaded with threads complementary to and configured to engage with the threads of the threaded rod 114, and an outer surface that is generally square when the valve gate 104 is assembled and viewed along the central longitudinal axis of the threaded rod 114. In use, the nut 116 can be threaded onto the threads of the main body of the threaded rod 114 and positioned within the tapping sleeve 102 with the square outer surface thereof retained such that it can travel along the central longitudinal axis of the threaded rod 114, but such that it cannot rotate about the central longitudinal axis of the threaded rod 114. Thus, when the threaded rod 114 is actuated to rotate about its own central longitudinal axis, the engagement of the threads between the threaded rod 114 and the nut 116 and the retention of the nut 116 against rotation about the central longitudinal axis of the threaded rod 114 result in travel of the nut 116 along the central longitudinal axis of the threaded rod 114, with rotation of the rod 114 in a first direction causing travel of the nut 116 in a first direction and rotation of the rod 114 in a second direction opposite the first resulting in travel of the nut 116 in a second direction opposite the first.

Figure 12:
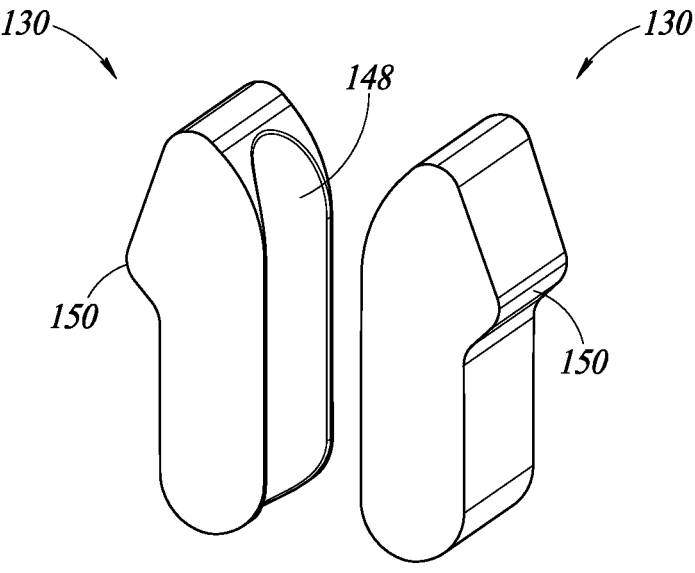
FIG. 12 illustrates a perspective view of a pair of levers of the valve gate of FIG. 5.

FIG. 12 illustrates the pair of levers 130 by themselves such that additional features thereof are revealed. As illustrated in FIG. 12, the two levers 130, which are identical to one another and positioned to form mirror images of one another, each include a shaft having a groove 148 extending into and along a first side thereof and a protrusion or ridge 150 extending out of a second side thereof opposite to the first side thereof. Furthermore, each of the levers 130 has a first curved surface at a first end of its shaft that curves from the first side thereof including the groove 148 to the second side thereof including the protrusion or ridge 150. As further illustrated in FIG. 12, when the valve gate 104 is assembled, the pair of levers 130 are arranged such that they are generally aligned with one another, such that the first sides thereof and the grooves formed therein face toward one another, and such that the second sides thereof and the protrusions formed therein face away from one another. Respective end portions of the levers 130 can be spaced apart from one another by a distance corresponding to or matching a distance between the sockets 134*a* and 134*b* and a distance between the sockets of the protrusion of the upstream portion of the housing 122, such that the end portions of the levers 130 can be seated within the sockets 134*a*, 134*b*, and the sockets of the protrusion of the upstream portion of the housing 122 when the valve gate 104 is assembled. Furthermore, the grooves 148 formed in the inner surfaces of the levers 130 can have curvatures configured to accommodate, correspond to, or match, the curvature or diameter of the threaded rod 114, such that when the valve gate 104 is assembled, the threaded rod 114 can extend between the levers 130 and be positioned at least partially within the grooves 148 such that the levers 130 fit at least partially around the curvature of the threaded rod 114.

Figure 13:
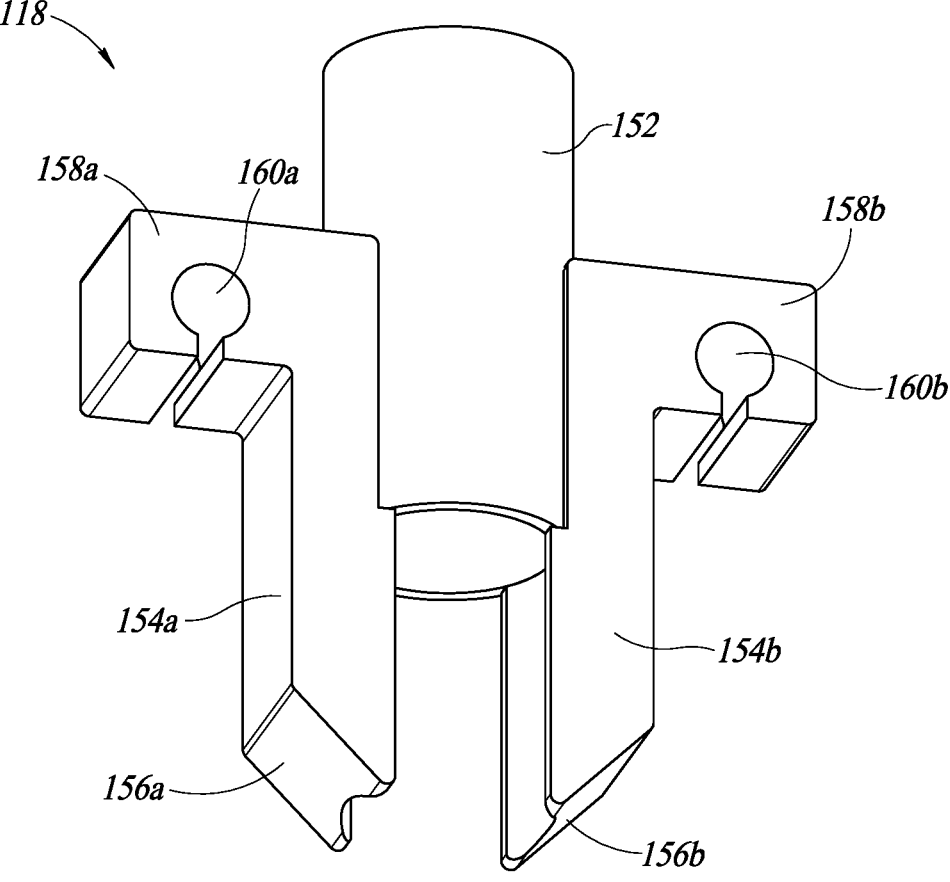
FIG. 13 illustrates a perspective view of a movable body of the valve gate of FIG. 5.

FIG. 13 illustrates the movable body 118 by itself such that additional features thereof are revealed. As illustrated in FIG. 13, the movable body 118 includes a hollow cylindrical body or spacer 152 that has a central longitudinal axis coincident with the central longitudinal axis of the threaded rod 114, and that is configured to extend around the threaded rod 114 such that the threaded rod 114 can extend through the spacer 152 without contacting the spacer 152. The movable body 118 also includes a first leg 154*a* that extends longitudinally away from a terminal end portion of the spacer 152 at a first side of the spacer 152 in a direction aligned with or parallel to the central longitudinal axis of the threaded rod 114, and a second leg 154*b* that extends longitudinally away from the terminal end portion of the spacer 152 at a second side of the spacer 152 opposite to the first side thereof in a direction aligned with or parallel to the central longitudinal axis of the threaded rod 114. As illustrated in FIG. 13, the first leg 154*a* and the second leg 154*b* each include a groove extending into and along a length of an inner side surface thereof, such that the grooves of the first and second legs 154*a*, 154*b* face each other. These grooves can have curvatures configured to accommodate, correspond to, or match, the curvature or diameter of the threaded rod 114, such that when the valve gate 104 is assembled, the threaded rod 114 can extend between the first and second legs 154*a*, 154*b*, and be positioned at least partially within the grooves such that the legs 154*a*, 154*b* fit at least partially around the curvature of the threaded rod 114.

As illustrated in FIG. 13, the first and second legs 154*a*, 154*b* each have square or rectangular cross-sectional shapes when viewed along the central longitudinal axis of the threaded rod 114. As further illustrated in FIG. 13, a terminal end portion of the first leg 154a distal from the spacer 152 includes a wedge 156a, such that the cross-sectional shape of the first leg 154a decreases along the length of the wedge 156a to a tip or terminal distal end of the first leg 154a. In particular, the inner side surface of the first leg 154a that includes the groove described above extends linearly longitudinally away from the terminal end portion of the spacer 152 to the terminal distal end of the first leg 154a and an outer side surface of the first leg 154a opposite to the inner side surface thereof and to the groove formed therein extends linearly longitudinally away from the terminal end portion of the spacer 152 to the wedge 156a, and then both away from the terminal end portion of the spacer 152 and toward the inner side surface throughout the length of the wedge 156a until the outer side surface meets the inner side surface at the terminal distal end of the first leg 154a. Thus, the wedge 156a has a variable rectangular cross-sectional shape that tapers toward an edge at the terminal distal end of the first leg 154a, where the edge extends generally front-to-back when the valve gate 104 is assembled and viewed along the central longitudinal axis of the pipeline 100.

Similarly, a terminal end portion of the second leg 154b distal from the spacer 152 includes a wedge 156b, such that the cross-sectional shape of the second leg 154b decreases along the length of the wedge 156b to a tip or terminal distal end of the second leg 154b. In particular, the inner side surface of the second leg 154b that includes the groove described above extends linearly longitudinally away from the terminal end portion of the spacer 152 to the terminal distal end of the second leg 154b and an outer side surface of the second leg 154b opposite to the inner side surface thereof and to the groove formed therein extends linearly longitudinally away from the terminal end portion of the spacer 152 to the wedge 156b, and then both away from the terminal end portion of the spacer 152 and toward the inner side surface throughout the length of the wedge 156b until the outer side surface meets the inner side surface at the terminal distal end of the second leg 154b. Thus, the wedge 156b has a variable rectangular cross-sectional shape that tapers toward an edge at the terminal distal end of the second leg 154b, where the edge extends generally front-to-back when the valve gate 104 is assembled and viewed along the central longitudinal axis of the pipeline 100. Thus, when taken together with the rest of the movable body 118, the wedges 156a and 156b form a terminal end portion of the movable body 118 and taper toward one another at the terminal end portion of the movable body 118.

The movable body 118 also includes a first arm 158a that extends radially outward away from the first side of the spacer 152, from which the first leg 154a extends, in a direction transverse or perpendicular to the central longitudinal axis of the threaded rod 114 and transverse or perpendicular to the first leg 154a, and a second arm 158b that extends radially outward away from the second side of the spacer 152, from which the second leg 154b extends, in a direction transverse or perpendicular to the central longitudinal axis of the threaded rod 114 and transverse or perpendicular to the second leg 154b. As illustrated in FIG. 13, the first and second arms 158a, 158b each have square or rectangular cross-sectional shapes when viewed along their own respective central longitudinal axes, which may be radial, transverse, and/or perpendicular to the central longitudinal axis of the threaded rod 114.

As further illustrated in FIG. 13, the first arm 158a includes an undercut groove 160a formed in a side surface of the first arm 158a that faces toward the wedge 156a at the terminal end portion of the first leg 154a, and that extends front-to-back along a length of the first arm 158a when the valve gate 104 is assembled and viewed along the central longitudinal axis of the pipeline 100. Similarly, the second arm 158b includes an undercut groove 160b formed in a side surface of the second arm 158b that faces toward the wedge 156b at the terminal end portion of the second leg 154b, and that extends front-to-back along a length of the second arm 158b when the valve gate 104 is assembled and viewed along the central longitudinal axis of the pipeline 100. When the valve gate 104 is assembled, portions of the first seal 120 can be seated within the first and second undercut grooves 160a, 160b to couple the first seal 120 to the movable body 118, as described further elsewhere herein.

Figure 14:
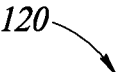
FIG. 14 illustrates a perspective view of a seal of the valve gate of FIG. 5.
Figure 14:
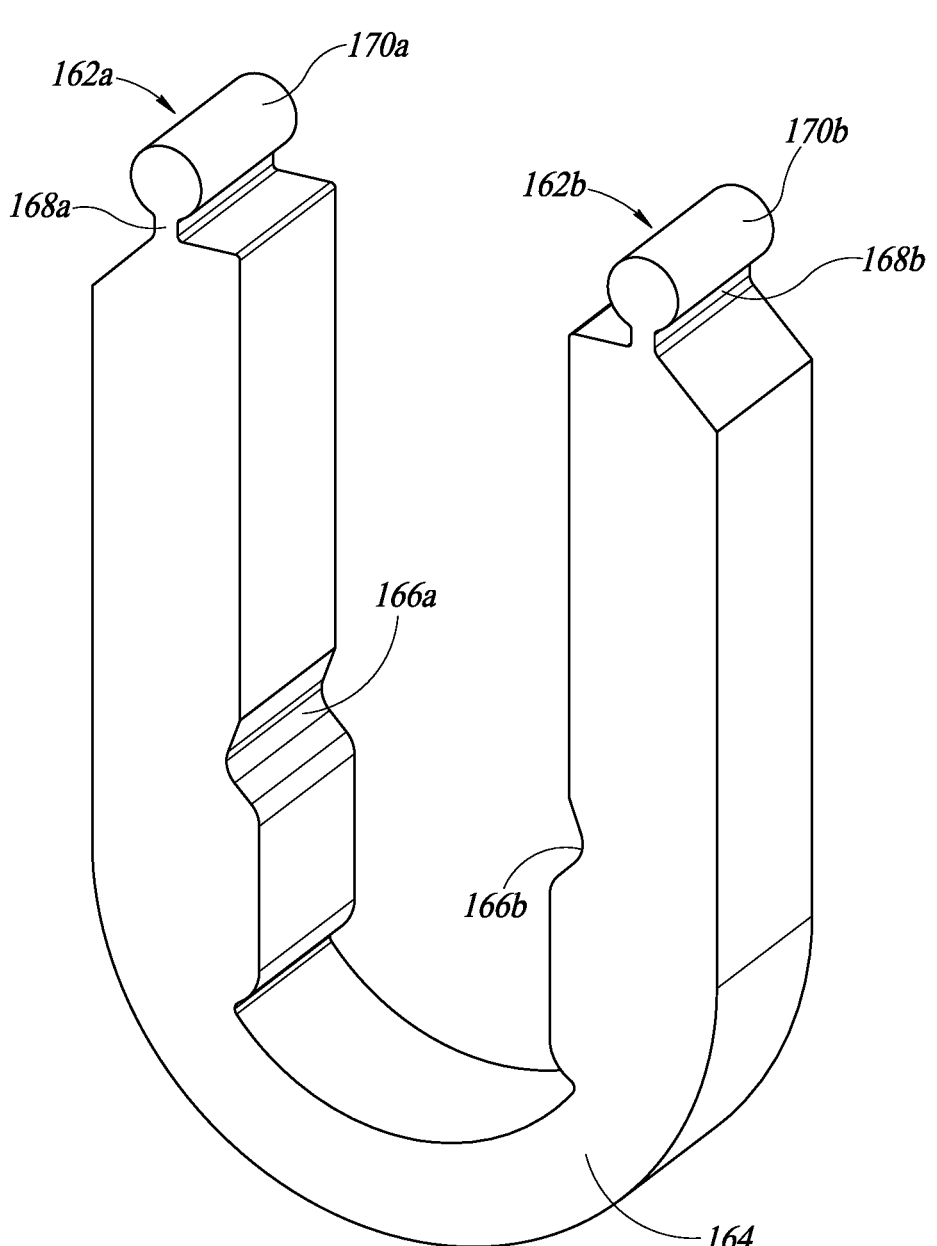

FIG. 14 illustrates the first seal 120 by itself such that additional features thereof are revealed. As illustrated in FIG. 14, the first seal 120 is generally U-shaped, and includes a first end portion 162a, which forms a first terminal end of its overall U-shape, and a second end portion 162b, which forms a second terminal end of its overall U-shape. The first seal 120 also includes an intermediate portion or main body 164 that extends longitudinally away from the first end portion 162a, curves to form a semi-circular curved intermediate or central portion thereof, and then extends longitudinally toward the second end portion 162b. When the valve gate 104 is assembled, the longitudinally-extending portions of the main body 164 may be aligned with or extend parallel or substantially parallel to each other and to the central longitudinal axis of the threaded rod 114.

As also illustrated in FIG. 14, the first seal 120 has a generally rectangular cross-sectional profile along a length of its overall U-shape, and the dimensions of the cross-sectional profile of the first seal 120 are variable along its length. For example, dimensions of the cross-sectional profile of the main body 164 of the first seal 120 decrease or taper toward each of the first end portion 162a and the second end portion 162b of the first seal 120, partially forming respective neck portions thereof. As another example, the first seal 120 includes a first indentation 166a formed in an inner surface of a first longitudinally-extending portion thereof (i.e., a surface that faces inward with respect to the overall U-shape or toward a second longitudinally-extending portion thereof) and a second indentation 166b formed in an inner surface of the second longitudinally-extending portion thereof (i.e., a surface that faces inward with respect to the overall U-shape or toward the first longitudinally-extending portion thereof). Dimensions of the cross-sectional profile of the main body 164 of the first seal 120 decrease or taper at each of the first and second indentations 166a, 166b, such as by amounts corresponding to dimensions of the protrusions or ridges 150 of the levers 130, such that the ridges 150 of the levers 130 can be snugly seated within the indentations 166a, 166b when the valve gate 104 is assembled.

As further illustrated in FIG. 14, the first end portion 162a includes a neck 168a coupled to the adjacent tapered portion of the main body 164 and a head, or a rail or shaft 170a that extends front-to-back when the valve gate 104 is assembled and viewed along the central longitudinal axis of the pipeline 100. Thus, the neck 168a couples the shaft 170a to the tapered portion of the main body 164. Similarly, the second end portion 162b includes a neck 168b coupled to the adjacent tapered portion of the main body 164 and a head, or a rail or shaft 170b that extends front-to-back when the valve gate 104 is assembled and viewed along the central longitudinal axis of the pipeline 100. Thus, the neck 168b couples the shaft 170b to the tapered portion of the main body 164. The shafts 170a, 170b have dimensions corresponding to or matching dimensions of the undercut grooves 160a, 160b, such that the shafts 170a, 170b can be seated within the undercut grooves 160a, 160b to securely couple the first seal 120 to the movable body 118.

FIGS. 6 and 8 illustrate additional details regarding the ways in which the various components of the valve gate 104 engage and interact with one another. As illustrated in FIGS. 6 and 8, when the valve gate 104 is assembled, the nut 116 is threaded onto the threaded rod 114 and positioned proximate the flange 142 of the threaded rod 114. The movable body 118 is mounted on the threaded rod 114 such that the threaded rod 114 extends through the spacer 152 and between the first and second legs 154a, 154b such that the threaded rod 114 is positioned at least partially within the grooves formed in the inner surfaces of the first and second legs 154a, 154b, such that the nut 116 is located between the movable body 118 and the flange 142 of the threaded rod 114 and abuts directly against a terminal end portion of the movable body 118 opposite to the wedges 156a, 156b thereof, and such that the movable body 118 can move freely along the length of the threaded rod 114 and the central longitudinal axis thereof.

As further illustrated in FIGS. 6 and 8, when the valve gate 104 is assembled, the shafts 170a, 170b of the first and second end portions 162a, 162b of the first seal 120 are seated within the undercut grooves 160a, 160b of the first and second arms 158a, 158b such that the first end portion 162a of the first seal 120 is securely coupled to the first arm 158a, the second end portion 162b of the first seal 120 is securely coupled to the second arm 158b, and the main body 164 of the first seal 120 extends around a terminal distal end portion of the threaded rod 114 and wraps around a distal end of the valve gate 104.

As further illustrated in FIGS. 6 and 8, the upstream portion of the housing 122 and the downstream portion of the housing 124 are positioned such that a majority of the threaded rod 114, a majority of the movable body 118, an inner portion of the first seal 120, and the pair of levers 130 are located or sandwiched between the upstream portion of the housing 122 and the downstream portion of the housing 124. When the upstream portion of the housing 122 and the downstream portion of the housing 124 are positioned in this manner, the protrusions thereof (e.g., protrusion 132) are positioned adjacent to and/or spaced apart from one another within an open space or pocket formed between the terminal distal end of the threaded rod 114 and an inner surface of the main body 164 at a central portion of the main body 164. The upstream portion of the housing 122 and the downstream portion of the housing 124 are coupled to one another in this configuration but not rigidly coupled to at least some of the other components of the valve gate 104 described herein, such that, for example, the threaded rod 114 can rotate freely, the nut 116 can translate freely, the movable body 118 can translate freely, the seal 120 can move freely, and the levers 130 can rotate freely, with respect to the upstream portion of the housing 122 and the downstream portion of the housing 124.

As further illustrated in FIGS. 6 and 8, when the valve gate 104 is assembled, the levers 130 are positioned as described elsewhere herein, that is, generally aligned with one another such that the grooves 148 face toward one another and such that the threaded rod 114 extends between the levers 130 and is positioned at least partially within the grooves 148. When so assembled, the levers are each located between the threaded rod 114 and a respective portion of the first seal 120, as well as between the wedges 156a, 156b of the movable body and the protrusions (e.g., protrusion 132) of the upstream portion of the housing 122 and the downstream portion of the housing 124. Furthermore, when so assembled, a first curved end of a first one of the levers 130 is positioned within both the first socket 134a formed in the protrusion 132 of the downstream portion of the housing 124 and the second socket formed in the protrusion of the upstream portion of the housing 122. Thus, the first one of the levers 130 can rotate, such as either frictionally or without friction by rolling against the curved surfaces of the first socket 134a and the second socket of the protrusion of the upstream portion of the housing 122, about an axis aligned with a central longitudinal axis of the pipeline 100 with respect to the other components of the assembled valve gate 104.

Furthermore, when the valve gate 104 is assembled, a second curved end of the first one of the levers 130 opposite to the first curved end thereof and the socket 134a and the second socket of the protrusion of the upstream portion of the housing 122 is engaged with and abuts against the outer side surface of the wedge 156a such that the wedge 156a extends between the second curved end of the first one of the levers 130 and the threaded rod 114. Additionally, the first one of the levers 130 is positioned such that an outer surface thereof is directly engaged with and abuts against an inner side surface of the main body 164 of the first seal 120, for example, such that the protrusion 150 of the first one of the levers 130 is seated snugly within the first indentation 166a of the main body 164 of the first seal 120.

Similarly, when so assembled, a first curved end of a second one of the levers 130 is positioned within both the second socket 134b formed in the protrusion 132 of the downstream portion of the housing 124 and the first socket formed in the protrusion of the upstream portion of the housing 122. Thus, the second one of the levers 130 can rotate, such as either frictionally or without friction by rolling against the curved surfaces of the second socket 134b and the first socket of the protrusion of the upstream portion of the housing 122, about an axis aligned with a central longitudinal axis of the pipeline 100 with respect to the other components of the assembled valve gate 104.

Furthermore, when the valve gate 104 is assembled, a second curved end of the second one of the levers 130 opposite to the first curved end thereof and the socket 134b and the first socket of the protrusion of the upstream portion of the housing 122 is engaged with and abuts against the outer side surface of the wedge 156b such that the wedge 156b extends between the second curved end of the second one of the levers 130 and the threaded rod 114. Additionally, the second one of the levers 130 is positioned such that an outer surface thereof is directly engaged with and abuts against an inner side surface of the main body 164 of the first seal, for example, such that the protrusion 150 of the second one of the levers 130 is seated snugly within the second indentation 166b of the main body 164 of the first seal 120.

To actuate and operate the valve gate 104, such as to move the valve gate 104 into the pipeline 100 through the opening 110 and thereby begin to seal the pipeline 100, as described elsewhere herein, an operator can actuate the threaded rod 114 to rotate about its own central longitudinal axis by engaging other device(s) with the terminal end portion 144 of the threaded rod 114, including with the keyway 146 thereof. Actuating the threaded rod 114 to rotate about its own central longitudinal axis, as also described elsewhere herein, causes the nut 116 to travel along the length of the threaded rod 114 and its central longitudinal axis. Because the nut 116 abuts against a terminal end portion of the movable body 118 and the movable body 118 is free to move along the length of the threaded rod 114, causing the nut 116 to travel along the length of the threaded rod 114 also causes the movable body 118 to travel along the length of the threaded rod 114 and its central longitudinal axis.

While the valve gate 104 is being moved into the pipeline 100 through the opening 110, and before a distal end of the valve gate 104 comes into contact with a surface of the pipeline 100 opposite to the opening 110, causing movement of the movable body 118 along the length of the threaded rod 114 also causes the rest of the valve gate 104, including the first seal 120, the levers 130, the upstream portion of the housing 122, and the downstream portion of the housing 124, to move along the length of the threaded rod 114 into the pipeline 100. Once the valve gate 104 has been moved into the pipeline 100 through the opening 110 and the distal end of the valve gate 104 comes into contact with the surface of the pipeline 100 opposite the opening 110, however, further distal movement of a central portion of the main body 164 of the first seal 120 (i.e., a distal portion thereof), the upstream portion of the housing 122, and the downstream portion of the housing 124 is blocked or prevented by the engagement of the valve gate 104 with the surface of the pipeline 100 opposite the opening 110.

Thus, at this stage, continued movement of the movable body 118 along the length of the threaded rod 114 causes continued movement of the first and second end portions 162a, 162b of the first seal, but not of the entirety of the main body 164 of the first seal 120. Continued movement of the movable body 118 along the length of the threaded rod 114 also causes the outer surfaces of the wedges 156a, 156b to exert forces against the second curved ends of the levers 130, which, when combined with the engagement of the first curved ends of the levers 130 with the sockets 134a, 134b, and the sockets of the protrusion of the upstream portion of the housing 122, causes the levers 130 to pivot or rotate outward with respect to one another and with respect to the threaded rod 114 about their first curved ends engaged with the sockets 134a, 134b, and the sockets of the protrusion of the upstream portion of the housing 122. Such rotation may be without friction, in the sense that the curved surfaces of the levers 130 roll along, rather than slide along or rotate against, the curved surfaces of the sockets 134a, 134b, and the sockets of the protrusion of the upstream portion of the housing 122.

Such outward rotation of the levers 130, combined with the engagement of the outer surfaces of the levers 130 with the inner surface of the first seal 120, causes the portions of the first seal 120 engaged with the levers 130 to move outward, thereby causing the overall profile of the valve gate 104 when viewed along the central longitudinal axis of the pipeline 100 to expand, such as to a profile that is larger than the opening 110 in the pipeline 100. In some embodiments, the continued movement of the first and second end portions 162a, 162b of the first seal, but not of the entirety of the main body 164 of the first seal 120 allows for some slack to develop in the seal 120 between the first and second end portions 162a, 162b and the distal, central portion of the main body 164, which slack can be taken up, such as entirely taken up, by the expansion of the main body 164 outwards with respect to the threaded rod 114.

While the first seal 120 is expanding radially outward with respect to the central longitudinal axis of the pipeline 100, and before the first seal 120 fully engages with the inner surface of the pipeline 100 to form a complete seal therewith, continued movement of the movable body 118 along the length of the threaded rod 114 causes continued outward rotation of the levers 130 and continued expansion of the main body 164 of the first seal 120 radially outwards with respect to the central longitudinal axis of the pipeline 100. Once the main body 164 of the first seal 120 fully engages with the inner surface of the pipeline 100 and forms a complete seal therewith, however, further expansion of the first seal 120 is blocked or prevented by the engagement of the first seal 120 with the inner surface of the pipeline 100. At this stage, rotation of the threaded rod 114 can be ceased and the actuation of the valve gate 104 to seal the pipeline 100 is complete. In this configuration, the valve gate 104 is in an engaged, inserted, closed, and sealed position or configuration.

To actuate and operate the valve gate 104, such as to retract the valve gate 104 by moving the valve gate 104 out of the pipeline 100 through the opening 110, as described elsewhere herein, an operator can actuate the threaded rod 114 to rotate about its own central longitudinal axis by engaging other device(s) with the terminal end portion 144 of the threaded rod 114, including with the keyway 146 thereof, such that the threaded rod 114 rotates in a direction opposite to that used to insert the valve gate 104. Such rotation of the threaded rod 114 acts to move the components of the valve gate 104 in directions opposite to those described above for the insertion of the valve gate 104. For example, in a first step, the first seal 120 is retracted inward and the overall profile of the valve gate 104 as viewed along the central longitudinal axis of the pipeline 100 decreases, such as to a profile that is smaller than the opening 110 in the pipeline 100. As another example, in a second step, the valve gate 104 may be retracted from the pipeline 100 through the opening 110 therein. Such actions can be used to move the valve gate 104 to a disengaged, retracted, withdrawn, open, and unsealed position or configuration. Inserting and retracting the valve gate 104 to seal and unseal the pipeline 100 can be repeated as desired.

Figure 15:
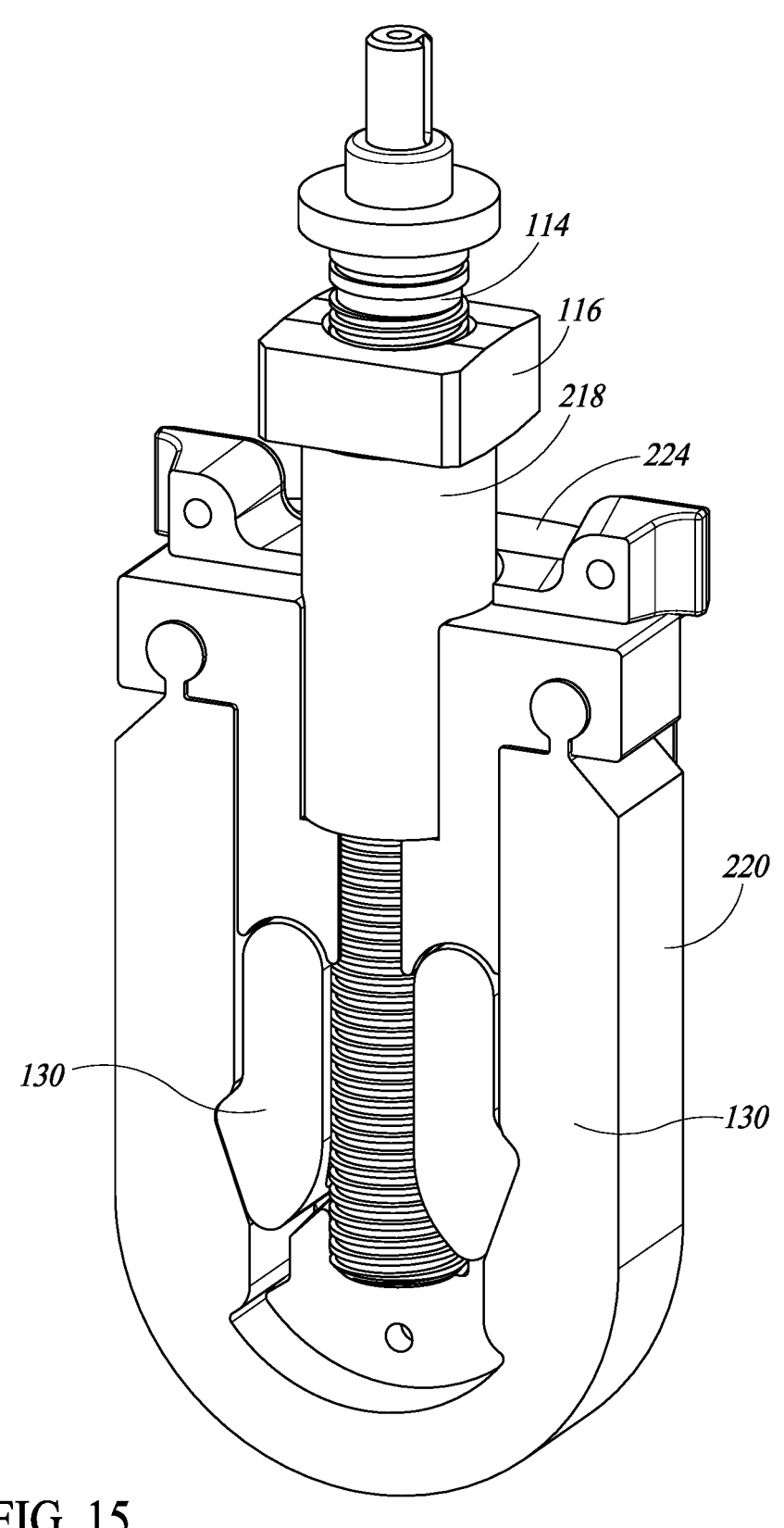
FIG. 15 illustrates a perspective view of another valve gate with seal components and a portion of a housing removed.
Figure 16:
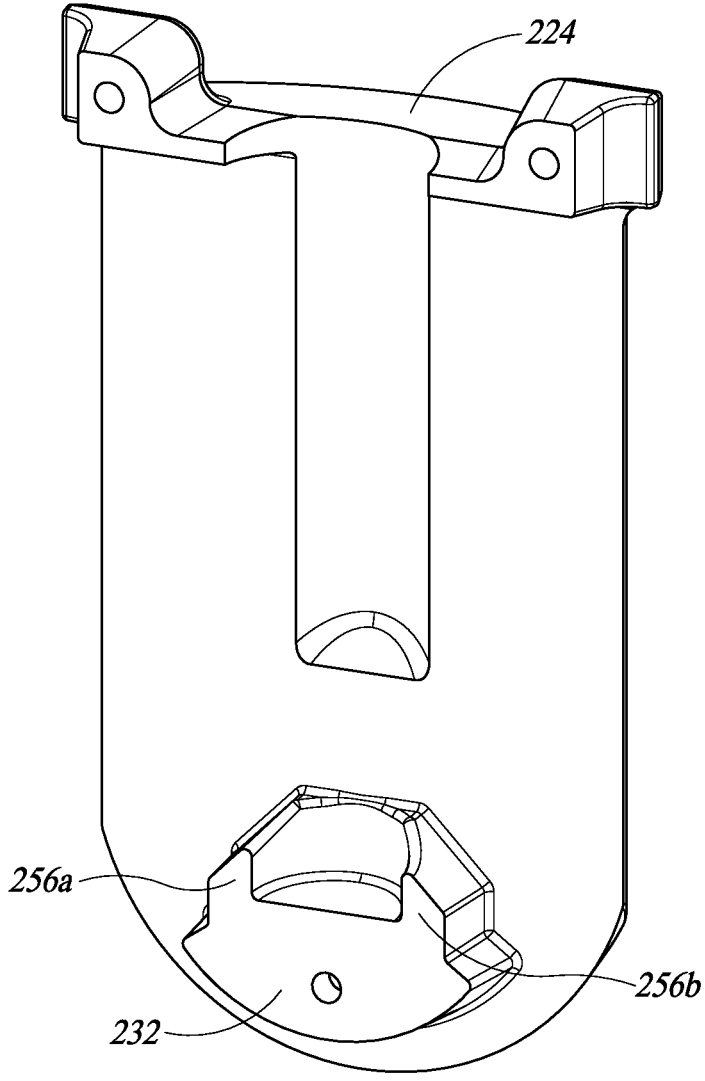
FIG. 16 illustrates a perspective view of a portion of a housing of the valve gate of FIG. 15.

FIGS. 15-20 illustrate additional features of alternative valve gate components that can be used with any of the components and features of the valve gate 104 described herein. FIGS. 15-20 illustrate such alternative valve gate components together with the threaded rod 114, the nut 116, and the pair of levers 130, which are oriented upside down in FIGS. 15-20 with respect to the other components of the valve gate as compared to their orientation with respect to the other components of the valve gate 104 in FIGS. 5-14. For example, FIGS. 15 and 16 illustrate various features of alternative valve gate components from a single consistent perspective view. As illustrated in FIGS. 15 and 16, the alternative components include a spacer or load transfer or movable body 218, a seal 220, and a housing component or portion of a housing 224, which may be a downstream portion of a housing 224.

FIG. 15 illustrates the alternative components with the upstream portion of the housing removed such that additional features of the alternative components, such as of the movable body 218 and the seal 220, are shown. FIG. 16 illustrates the downstream portion of the housing 224 by itself and shows that the downstream portion of the housing 224 includes a protrusion 232 that extends inwardly and in an upstream direction from an inner or upstream surface of the downstream portion of the housing 224.

As illustrated in FIG. 16, when a valve gate is located within the pipeline 100 and the downstream portion of the housing 224 and the protrusion 232 are viewed along the central longitudinal axis of the pipeline 100, the protrusion 232 includes a first wedge 256a, such that the cross-sectional shape of the first wedge 256a decreases along the length of the wedge 256a to a tip or terminal end of the first wedge 256a. In particular, an inner side surface of the first wedge 256a extends generally parallel to the central longitudinal axis of the threaded rod 114 and an outer side surface of the first wedge 256a opposite to the inner side surface thereof extends at an oblique angle toward the inner side surface throughout the length of the wedge 256a until the outer side surface meets the inner side surface at the terminal end of the first wedge 256a. Thus, the wedge 256a has a variable rectangular cross-sectional shape that tapers toward the nut 116 and toward an edge at the terminal end of the first wedge 256a, where the edge extends generally front-to-back when the valve gate is assembled and viewed along the central longitudinal axis of the pipeline 100.

As further illustrated in FIG. 16, when a valve gate is located within the pipeline 100 and the downstream portion of the housing 224 and the protrusion 232 are viewed along the central longitudinal axis of the pipeline 100, the protrusion 232 also includes a second wedge 256b, such that the cross-sectional shape of the second wedge 256b decreases along the length of the wedge 256b to a tip or terminal end of the second wedge 256b. In particular, an inner side surface of the second wedge 256b extends generally parallel to the central longitudinal axis of the threaded rod 114 and an outer side surface of the second wedge 256b opposite to the inner side surface thereof extends at an oblique angle toward the inner side surface throughout the length of the wedge 256b until the outer side surface meets the inner side surface at the terminal end of the second wedge 256b. Thus, the wedge 256b has a variable rectangular cross-sectional shape that tapers toward the nut 116 and toward an edge at the terminal end of the second wedge 256b, where the edge extends generally front-to-back when the valve gate is assembled and viewed along the central longitudinal axis of the pipeline 100. Thus, when taken together with the rest of the downstream portion of the housing 224, the wedges 256a and 256b taper toward one another.

An upstream portion of the housing may include a protrusion that extends inwardly and in a downstream direction from an inner or downstream surface of the upstream portion of the housing, and that is complementary to or a mirror image of the protrusion 232. When the valve gate is located within the pipeline 100 and the upstream portion of the housing and its protrusion are viewed along the central longitudinal axis of the pipeline 100, the protrusion of the upstream portion of the housing includes a third wedge such that the cross-sectional shape of the third wedge decreases along the length of the wedge to a tip or terminal end of the third wedge. In particular, an inner side surface of the third wedge extends generally parallel to the central longitudinal axis of the threaded rod 114 and an outer side surface of the third wedge opposite to the inner side surface thereof extends at an oblique angle toward the inner side surface throughout the length of the wedge until the outer side surface meets the inner side surface at the terminal end of the third wedge. Thus, the third wedge has a variable rectangular cross-sectional shape that tapers toward the nut 116 and toward an edge at the terminal end of the third wedge, where the edge extends generally front-to-back when the valve gate is assembled and viewed along the central longitudinal axis of the pipeline 100.

When a valve gate is located within the pipeline 100 and the upstream portion of the housing and its protrusion are viewed along the central longitudinal axis of the pipeline 100, the protrusion also includes a fourth wedge, such that the cross-sectional shape of the fourth wedge decreases along the length of the wedge to a tip or terminal end of the fourth wedge. In particular, an inner side surface of the fourth wedge extends generally parallel to the central longitudinal axis of the threaded rod 114 and an outer side surface of the fourth wedge opposite to the inner side surface thereof extends at an oblique angle toward the inner side surface throughout the length of the fourth wedge until the outer side surface meets the inner side surface at the terminal end of the fourth wedge. Thus, the fourth wedge has a variable rectangular cross-sectional shape that tapers toward the nut 116 and toward an edge at the terminal end of the fourth wedge, where the edge extends generally front-to-back when the valve gate is assembled and viewed along the central longitudinal axis of the pipeline 100. Thus, when taken together with the rest of the upstream portion of the housing, the third and fourth wedges taper toward one another.

Figure 17:
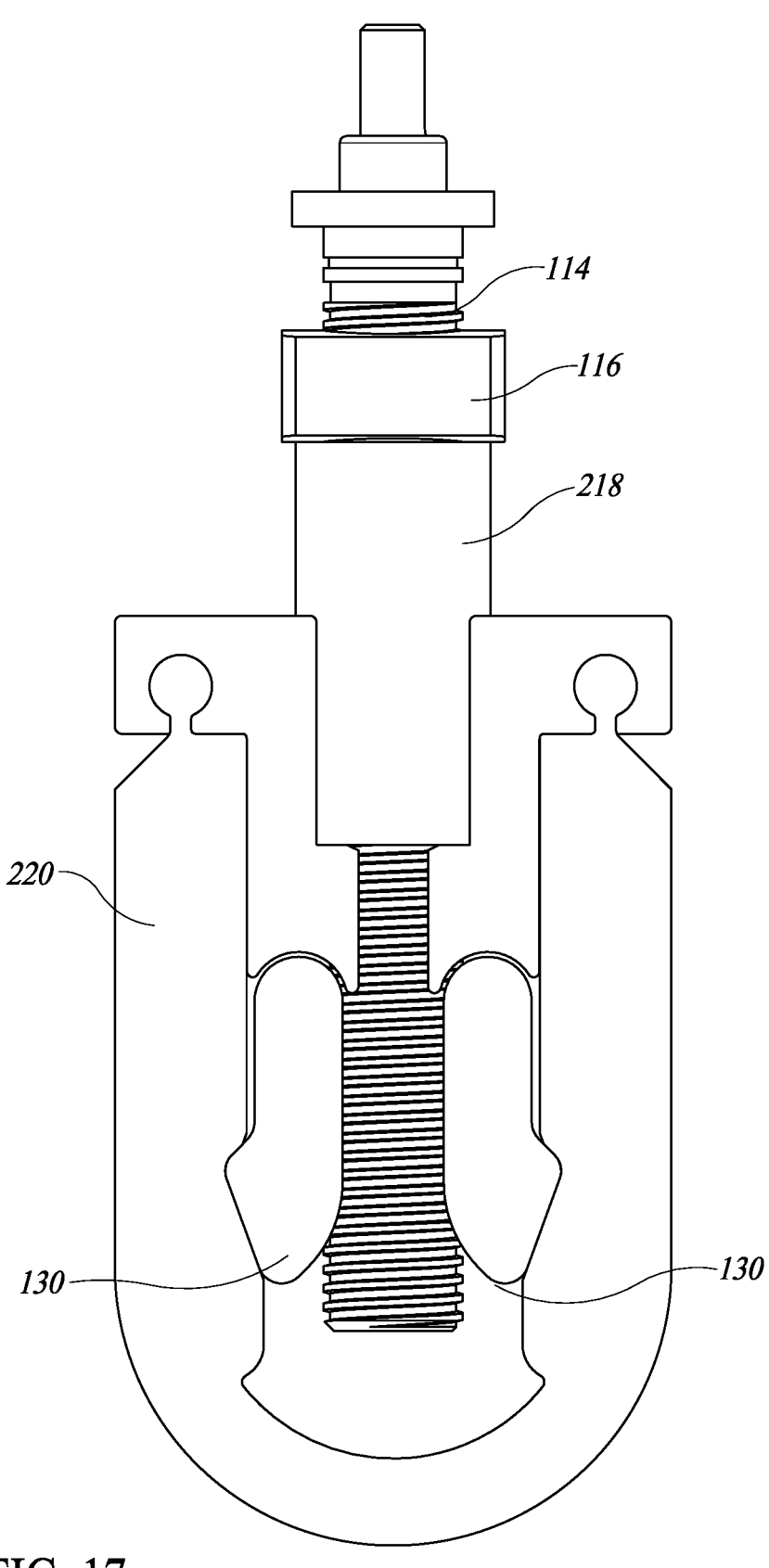
FIG. 17 illustrates a front view of the valve gate of FIG. 15 with a seal and two portions of a housing removed.
Figure 18:
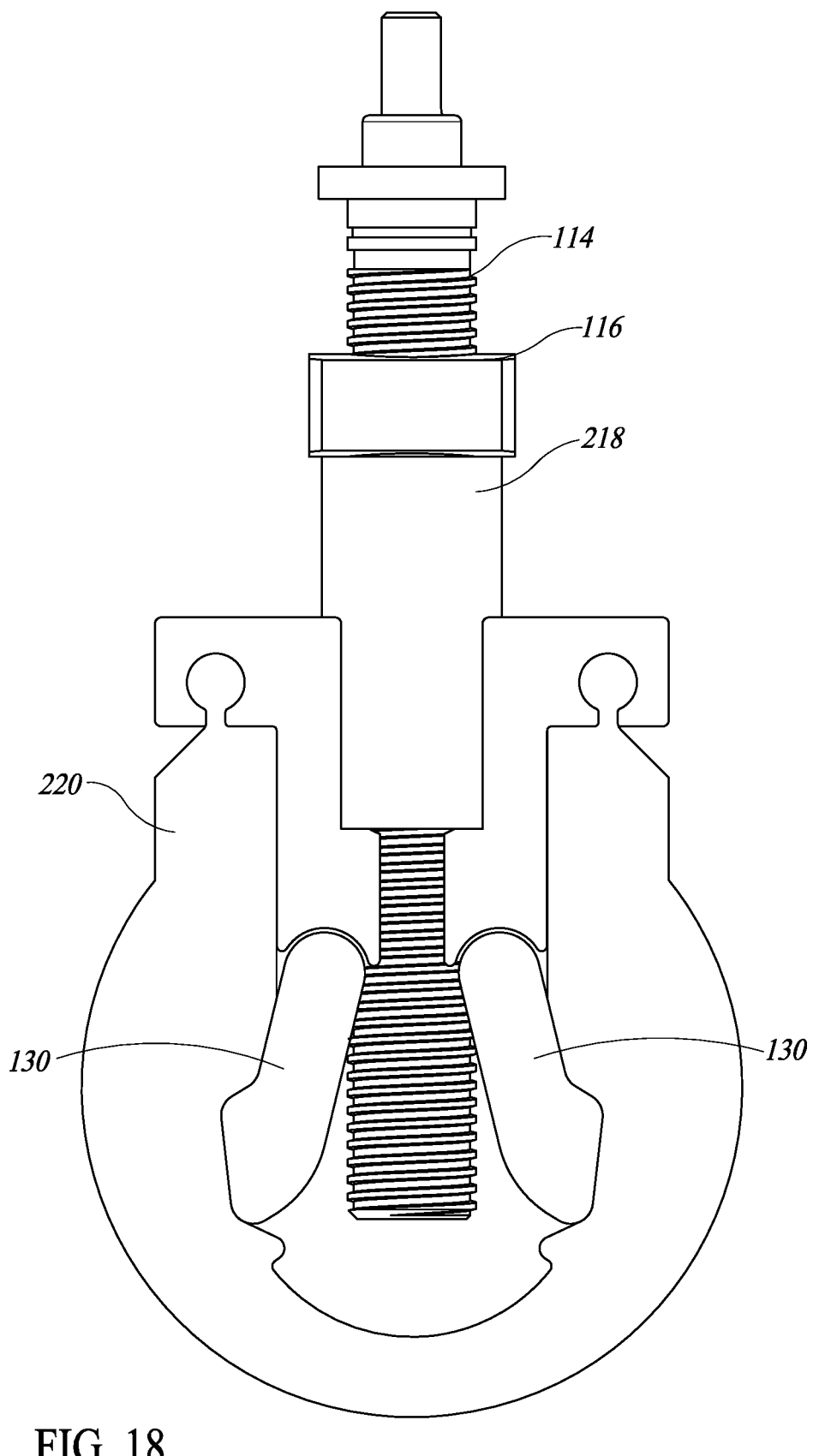
FIG. 18 illustrates a front view of the valve gate of FIG. 15 with a seal and two portions of a housing removed, where the valve gate is in an expanded configuration.

FIG. 17 illustrates a front view of a valve gate with the upstream portion of the housing and the downstream portion of the housing 224 removed such that other features of the valve gate, such as of the threaded rod 114, the nut 116, the movable body 218, the seal 220, and the pair of levers 130 are shown. FIG. 18 illustrates a front view of the valve gate similar to that of FIG. 17, but in a radially-expanded configuration.

Figure 19:
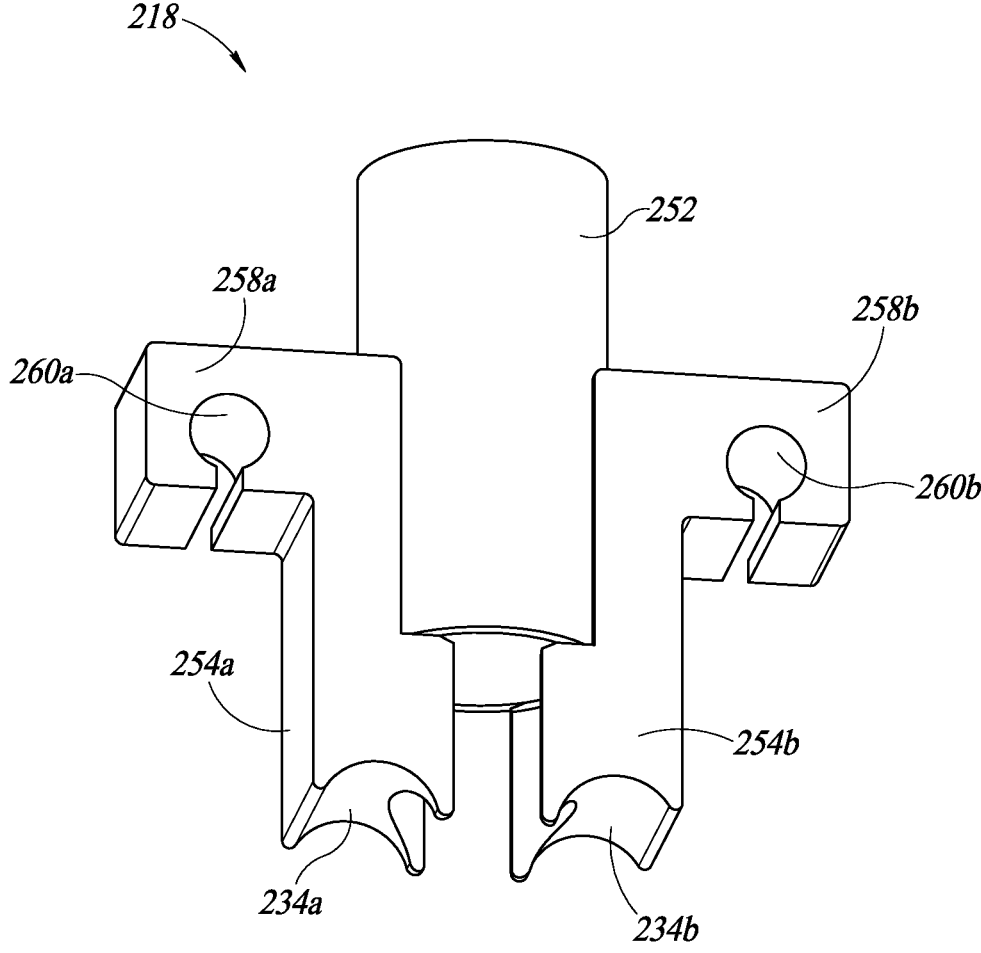
FIG. 19 illustrates a perspective view of a movable body of the valve gate of FIG. 15.

FIG. 19 illustrates the movable body 218 by itself such that additional features thereof are revealed. As illustrated in FIG. 19, the movable body 218 includes a hollow cylindrical body or spacer 252 that has a central longitudinal axis coincident with the central longitudinal axis of the threaded rod 114, and that is configured to extend around the threaded rod 114 such that the threaded rod 114 can extend through the spacer 252 without contacting the spacer 252. The movable body 218 also includes a first leg 254a that extends longitudinally away from a terminal end portion of the spacer 252 at a first side of the spacer 252 in a direction aligned with or parallel to the central longitudinal axis of the threaded rod 114, and a second leg 254b that extends longitudinally away from the terminal end portion of the spacer 252 at a second side of the spacer 252 opposite to the first side thereof in a direction aligned with or parallel to the central longitudinal axis of the threaded rod 114. As illustrated in FIG. 19, the first leg 254a and the second leg 254b each include a groove extending into and along a length of an inner side surface thereof, such that the grooves of the first and second legs 254a, 254b face each other. These grooves can have curvatures configured to accommodate, correspond to, or match, the curvature or diameter of the threaded rod 114, such that when the valve gate is assembled, the threaded rod 114 can extend between the first and second legs 254a, 254b, and be positioned at least partially within the grooves such that the legs 254a, 254b fit at least partially around the curvature of the threaded rod 114.

As illustrated in FIG. 19, the first and second legs 254a, 254b each have square or rectangular cross-sectional shapes when viewed along the central longitudinal axis of the threaded rod 114. As further illustrated in FIG. 19, terminal end portions of the first and second legs 254a and 254b distal from the spacer 252 include respective sockets 234a, 234b, each of which includes a curved bearing surface. In particular, when viewed along the central longitudinal axis of the pipeline 100, the first socket 234a is spaced apart from the central longitudinal axis of the threaded rod 114 by a first distance in a first direction, and the second socket 234b is spaced apart from the central longitudinal axis of the threaded rod 114 by a second distance, which may be the same as the first distance, in a second direction, which may be opposite to the first direction. Each of the sockets 234a, 234b includes a bearing surface that extends linearly in a direction along a respective axis aligned with or parallel to the central longitudinal axis of the pipeline 100, and that is curved about such respective axes. Thus, each of the sockets 234a, 234b forms a respective channel or cup oriented to face downward away from the nut 116 when the valve gate is assembled. Each of the sockets 234a, 234b can form a respective fulcrum for a respective one of the levers 130 when the valve gate is assembled and in use, as described further elsewhere herein. In some embodiments, the levers 130 may be mounted in the sockets 234a, 234b on axles. Thus, when taken together with the rest of the movable body 218, the sockets 234a, 234b form a terminal end portion of the movable body 218.

Figure 20:
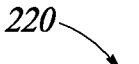
FIG. 20 illustrates a perspective view of a seal of the valve gate of FIG. 15.
Figure 20:
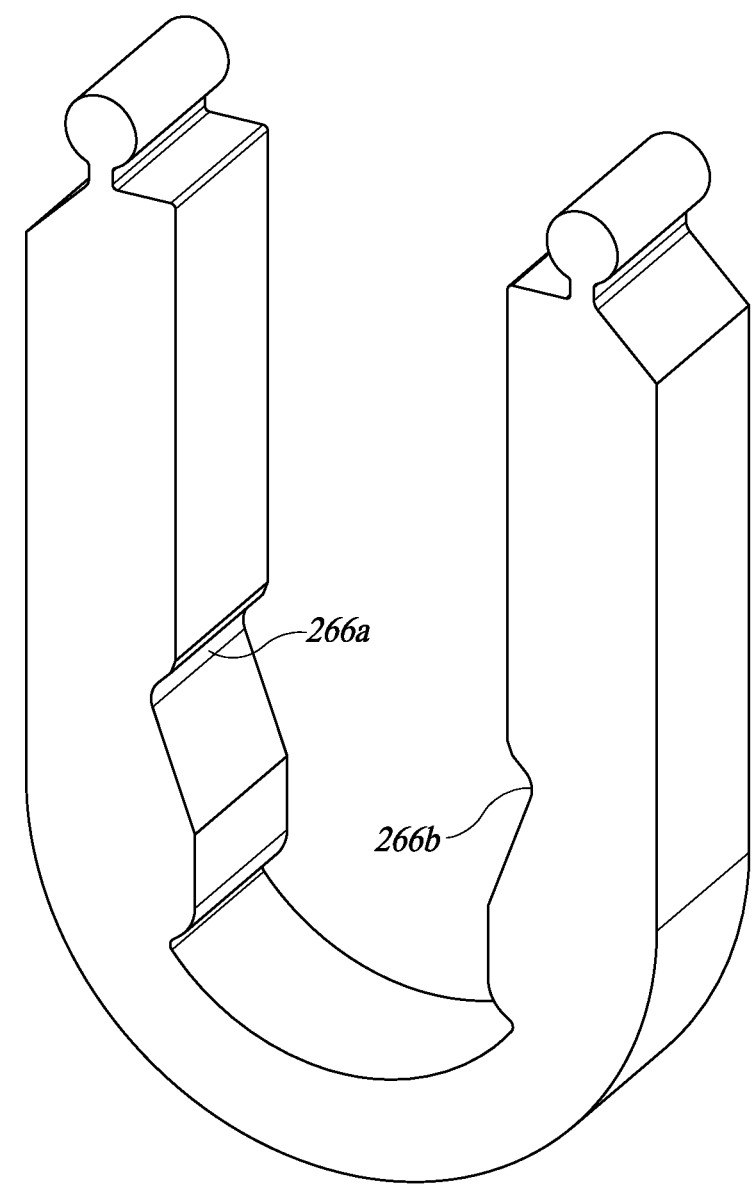

FIG. 20 illustrates the seal 220 by itself such that additional features thereof are revealed. As illustrated in FIG. 20, the seal 220 is largely the same as the first seal 120, but the seal 220 includes a first indentation 266a formed in an inner surface of a first longitudinally-extending portion thereof that corresponds to the first indentation 166a but is located at a slightly different position and oriented upside-down with respect to the indentation 166a, to accommodate the upside-down re-orientation of the levers 130 and a second indentation 266b formed in an inner surface of a second longitudinally-extending portion thereof that corresponds to the second indentation 166b but is located at a slightly different position and oriented upside-down with respect to the indentation 166b, to accommodate the upside-down re-orientation of the levers 130.

FIGS. 15 and 17 illustrate additional details regarding the ways in which the various components of a valve gate including the alternative components engage and interact with one another. As illustrated in FIGS. 15 and 17, when the valve gate is assembled, the various components of the valve gate may engage with one another in many of the same ways described herein with respect to the valve gate 104, with differences noted herein.

When assembled, a first curved end of a first one of the levers 130 is positioned within the first socket 234a formed in the terminal end portion of the first leg 254a of the movable body 218. Thus, the first one of the levers 130 can rotate, such as either frictionally or without friction by rolling against the curved surface of the first socket 234a, about an axis aligned with a central longitudinal axis of the pipeline 100 with respect to the other components of the assembled valve gate. Furthermore, a second curved end of the first one of the levers 130 opposite to the first curved end thereof and the socket 234a is engaged with and abuts against the outer side surface of the wedge 256a and the fourth wedge such that the wedge 256a and the fourth wedge extend between the second curved end of the first one of the levers 130 and the threaded rod 114. Additionally, the first one of the levers 130 is positioned such that an outer surface thereof is directly engaged with and abuts against an inner side surface of the seal 220, for example, such that the protrusion 150 of the first one of the levers 130 is seated snugly within the first indentation 266a of the seal 220.

Similarly, when so assembled, a first curved end of a second one of the levers 130 is positioned within the second socket 234b formed in the terminal end portion of the second leg 254b of the movable body 218. Thus, the second one of the levers 130 can rotate, such as either frictionally or without friction by rolling against the curved surface of the second socket 234b, about an axis aligned with a central longitudinal axis of the pipeline 100 with respect to the other components of the assembled valve gate. Furthermore, when the valve gate is assembled, a second curved end of the second one of the levers 130 opposite to the first curved end thereof and the socket 234b is engaged with and abuts against the outer side surface of the wedge 256b and the third wedge such that the wedge 256b and the third wedge extend between the second curved end of the second one of the levers 130 and the threaded rod 114. Additionally, the second one of the levers 130 is positioned such that an outer surface thereof is directly engaged with and abuts against an inner side surface of the seal 220, for example, such that the protrusion 150 of the second one of the levers 130 is seated snugly within the second indentation 266b of the seal 220.

To actuate and operate the valve gate, such as to move the valve gate into the pipeline 100 through the opening 110 and thereby begin to seal the pipeline 100, as described elsewhere herein, an operator can actuate the threaded rod 114 to rotate about its own central longitudinal axis by engaging other device(s) with the terminal end portion 144 of the threaded rod 114, including with the keyway 146 thereof. Actuating the threaded rod 114 to rotate about its own central longitudinal axis, as also described elsewhere herein, causes the nut 116 to travel along the length of the threaded rod 114 and its central longitudinal axis. Because the nut 116 abuts against a terminal end portion of the movable body 218 and the movable body 218 is free to move along the length of the threaded rod 114, causing the nut 116 to travel along the length of the threaded rod 114 also causes the movable body 218 to travel along the length of the threaded rod 114 and its central longitudinal axis.

While the valve gate is being moved into the pipeline 100 through the opening 110, and before a distal end of the valve gate comes into contact with a surface of the pipeline 100 opposite to the opening 110, causing movement of the movable body 218 along the length of the threaded rod 114 also causes the rest of the valve gate, including the seal 220, the levers 130, the upstream portion of the housing, and the downstream portion of the housing 224, to move along the length of the threaded rod 114 into the pipeline 100. Once the valve gate has been moved into the pipeline 100 through the opening 110 and the distal end of the valve gate comes into contact with the surface of the pipeline 100 opposite the opening 110, however, further distal movement of a distal portion of the seal 220, the upstream portion of the housing, and the downstream portion of the housing 224 is blocked or prevented by the engagement of the valve gate with the surface of the pipeline 100 opposite the opening 110.

Thus, at this stage, continued movement of the movable body 218 along the length of the threaded rod 114 causes the outer surfaces of the wedges 256a, 256b, and the third and fourth wedges to exert forces against the second curved ends of the levers 130, which, when combined with the engagement of the first curved ends of the levers 130 with the sockets 234a, 234b, causes the levers 130 to pivot or rotate outward with respect to one another and with respect to the threaded rod 114 about their first curved ends engaged with the sockets 234a, 234b. Such rotation may be without friction, in the sense that the curved surfaces of the levers 130 roll along, rather than slide along or rotate against, the curved surfaces of the sockets 234a, 234b. Such outward rotation of the levers 130, combined with the engagement of the outer surfaces of the levers 130 with the inner surface of the seal 220, causes the portions of the seal 220 engaged with the levers 130 to move outward, thereby causing the overall profile of the valve gate when viewed along the central longitudinal axis of the pipeline 100 to expand, such as to a profile that is larger than the opening 110 in the pipeline 100.

While the seal 220 is expanding radially outward with respect to the central longitudinal axis of the pipeline 100, and before the seal 220 fully engages with the inner surface of the pipeline 100 to form a complete seal therewith, continued movement of the movable body 218 along the length of the threaded rod 114 causes continued outward rotation of the levers 130 and continued expansion of the seal 220 radially outwards with respect to the central longitudinal axis of the pipeline 100. Once the seal 220 fully engages with the inner surface of the pipeline 100 and forms a complete seal therewith, however, further expansion of the seal 220 is blocked or prevented by the engagement of the seal 220 with the inner surface of the pipeline 100. At this stage, rotation of the threaded rod 114 can be ceased and the actuation of the valve gate to seal the pipeline 100 is complete. In this configuration, the valve gate is in an engaged, inserted, closed, and sealed position or configuration.

To actuate and operate the valve gate, such as to retract the valve gate by moving the valve gate out of the pipeline 100 through the opening 110, as described elsewhere herein, an operator can actuate the threaded rod 114 to rotate about its own central longitudinal axis by engaging other device(s) with the terminal end portion 144 of the threaded rod 114, including with the keyway 146 thereof, such that the threaded rod 114 rotates in a direction opposite to that used to insert the valve gate. Such rotation of the threaded rod 114 acts to move the components of the valve gate in directions opposite to those described above for the insertion of the valve gate. For example, in a first step, the seal 220 is retracted inward and the overall profile of the valve gate as viewed along the central longitudinal axis of the pipeline 100 decreases, such as to a profile that is smaller than the opening 110 in the pipeline 100. As another example, in a second step, the valve gate may be retracted from the pipeline 100 through the opening 110 therein. Such actions can be used to move the valve gate to a disengaged, retracted, withdrawn, open, and unsealed position or configuration. Inserting and retracting the valve gate to seal and unseal the pipeline 100 can be repeated as desired.

Figure 21:
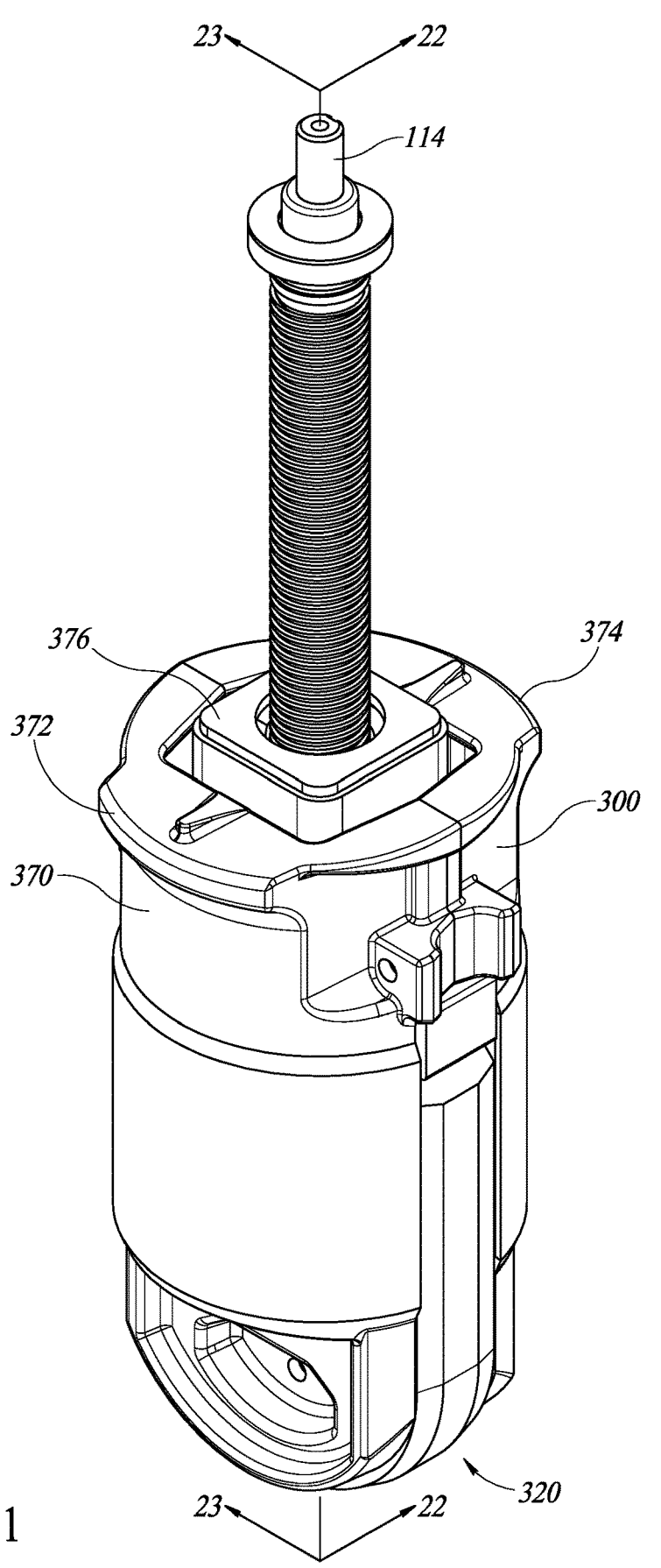
FIG. 21 illustrates a perspective view of another valve gate.
Figure 22:
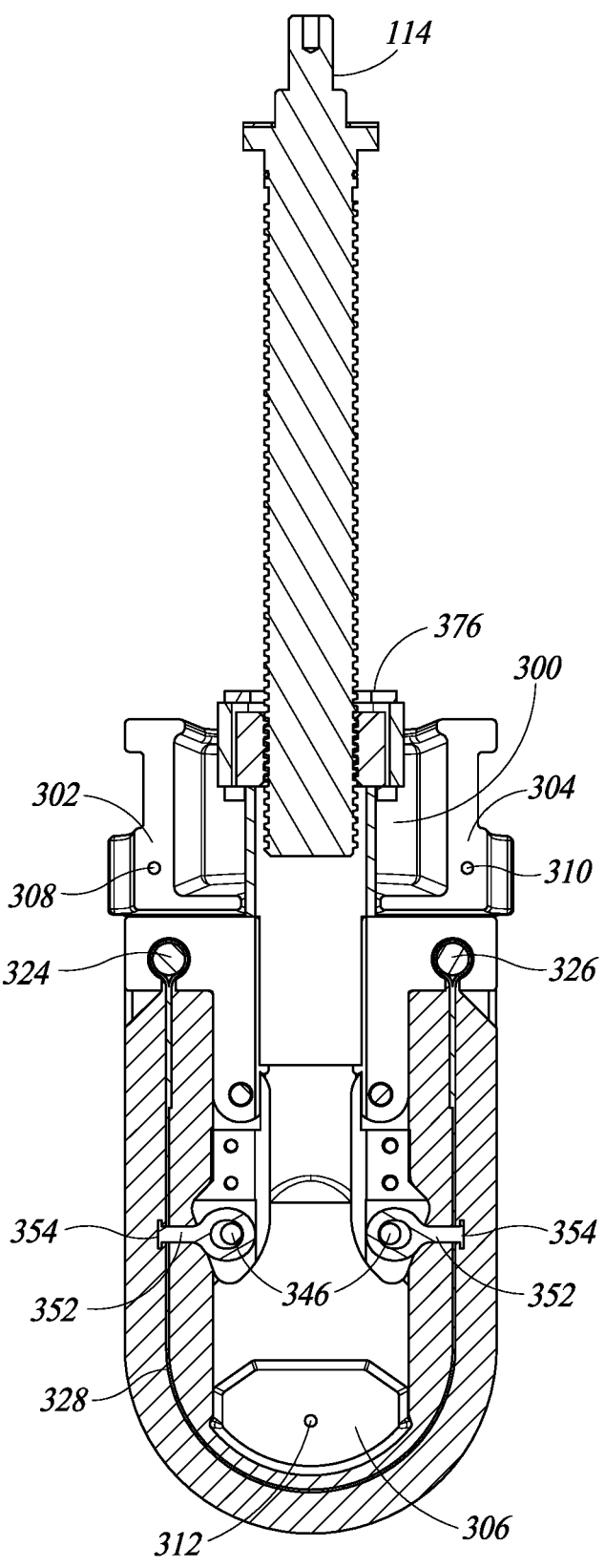
FIG. 22 illustrates a cross-sectional view of the valve gate of FIG. 21 taken along line 22-22 in FIG. 21.
Figure 23:
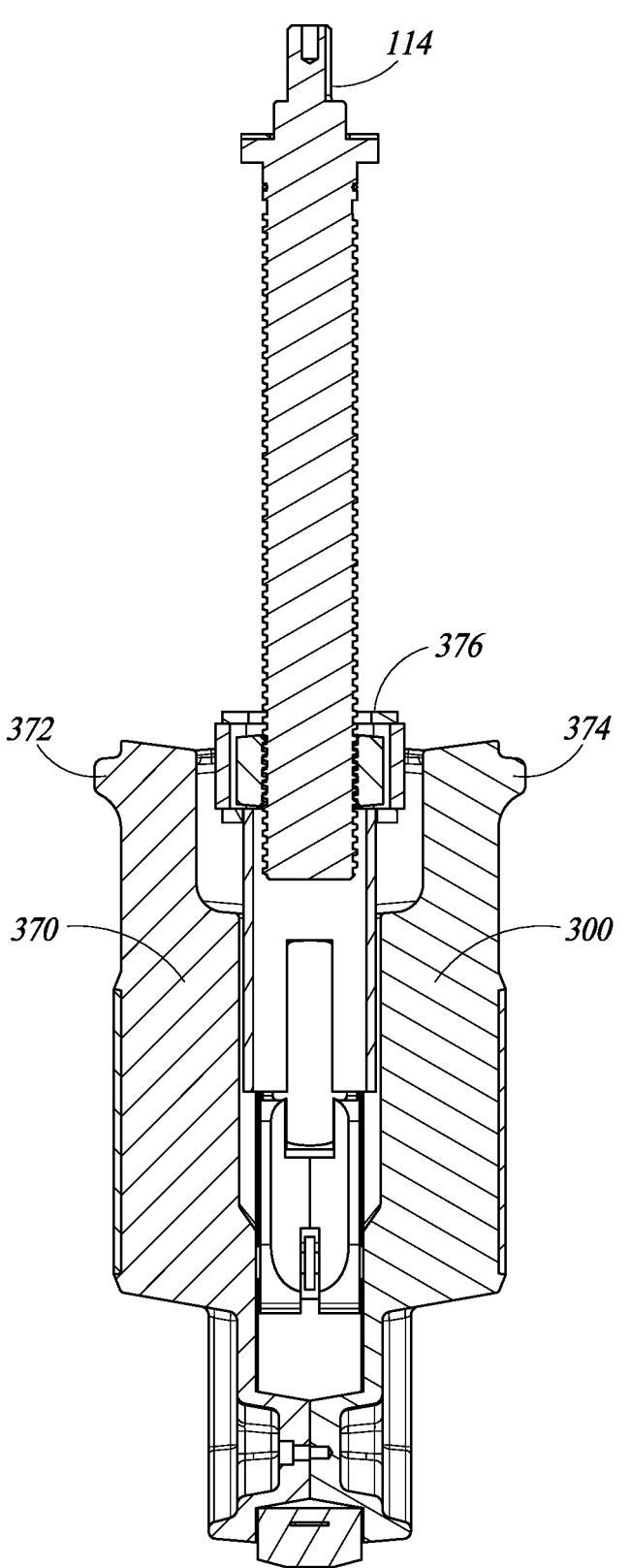
FIG. 23 illustrates a cross-sectional view of the valve gate of FIG. 21 taken along line 23-23 in FIG. 21.

FIGS. 21-31 illustrate additional features of alternative valve gate components that can be used with any of the components and features of the valve gate 104 described herein. FIG. 21 illustrates a perspective view of the alternative valve gate components in an assembled state and FIGS. 22 and 23 illustrate cross-sectional views of the alternative valve gate components in the assembled state taken along lines 22-22 and 23-23 in FIG. 21. As illustrated in FIGS. 21-23, the alternative valve gate components include an upstream portion of a housing 370 and a downstream portion of a housing 300. The upstream portion of the housing 370 includes a protrusion 372 extending radially outwardly and in an upstream direction from an outer or upstream surface of the upstream portion of the housing 370 at an uppermost or proximal-most end of the upstream portion of the housing 370 in a direction aligned with the central longitudinal axis of the threaded rod 114. The downstream portion of the housing 300 includes a protrusion 374 extending radially outwardly and in a downstream direction from an outer or downstream surface of the downstream portion of the housing 300 at an uppermost or proximal-most end of the downstream portion of the housing 300 in a direction aligned with the central longitudinal axis of the threaded rod 114. As illustrated in FIG. 23, the protrusions 372 and 374 extend radially outward from a central longitudinal axis of the threaded rod 114 farther than any other component of the valve gate.

When a valve gate including such features is located within the tapping sleeve 102, radially-outermost ends of the protrusions 372 and 374 can form bearing surfaces configured to engage with inner surfaces of the tapping sleeve 102. As described elsewhere herein, when a valve gate is inserted into the pipeline 100, pressure of a fluid within the pipeline 100 can urge the valve gate to move in a downstream direction. Under such circumstances, engagement of the protrusions 372 and 374 with the inner surfaces of the tapping sleeve 102 can restrain movement of the valve gate, such that the pressure of the fluid bends the valve gate in a downstream direction about a location where the valve gate engages with the cut surface of the saddle-shaped opening 110. Such engagement and restraint can help to reduce or prevent binding of threads within the valve gate, such as of the threads of the threaded rod 114 and the threads of the nut 116, and can make retraction of the valve gate from the pipeline 100 more straightforward.

As further illustrated in FIGS. 21-23, the alternative valve gate components include a box 376 which can surround, capture, and encapsulate the nut 116. As described elsewhere herein, the box 376 can retain the square outer surface of the nut 116 such that the nut 116 can travel along the central longitudinal axis of the threaded rod 114, but such that the nut 116 cannot rotate about the central longitudinal axis of the threaded rod 114. Thus, when the threaded rod 114 is actuated to rotate about its own central longitudinal axis, the engagement of the threads between the threaded rod 114 and the nut 116, and the retention of the nut 116 against rotation about the central longitudinal axis of the threaded rod 114 by the box 376 result in travel of the nut 116 along the central longitudinal axis of the threaded rod 114, with rotation of the rod 114 in a first direction causing travel of the nut 116 in a first direction and rotation of the rod 114 in a second direction opposite the first resulting in travel of the nut 116 in a second direction opposite the first. The box 376 itself may be restrained against rotation with respect to other components of the valve gate in a variety of ways. For example, in some embodiments, the box 376 may be rigidly coupled to or formed integrally with a top or proximal end portion of a movable body 318 (described in more detail elsewhere herein) in a direction aligned with the central longitudinal axis of the threaded rod 114.

Figure 24:
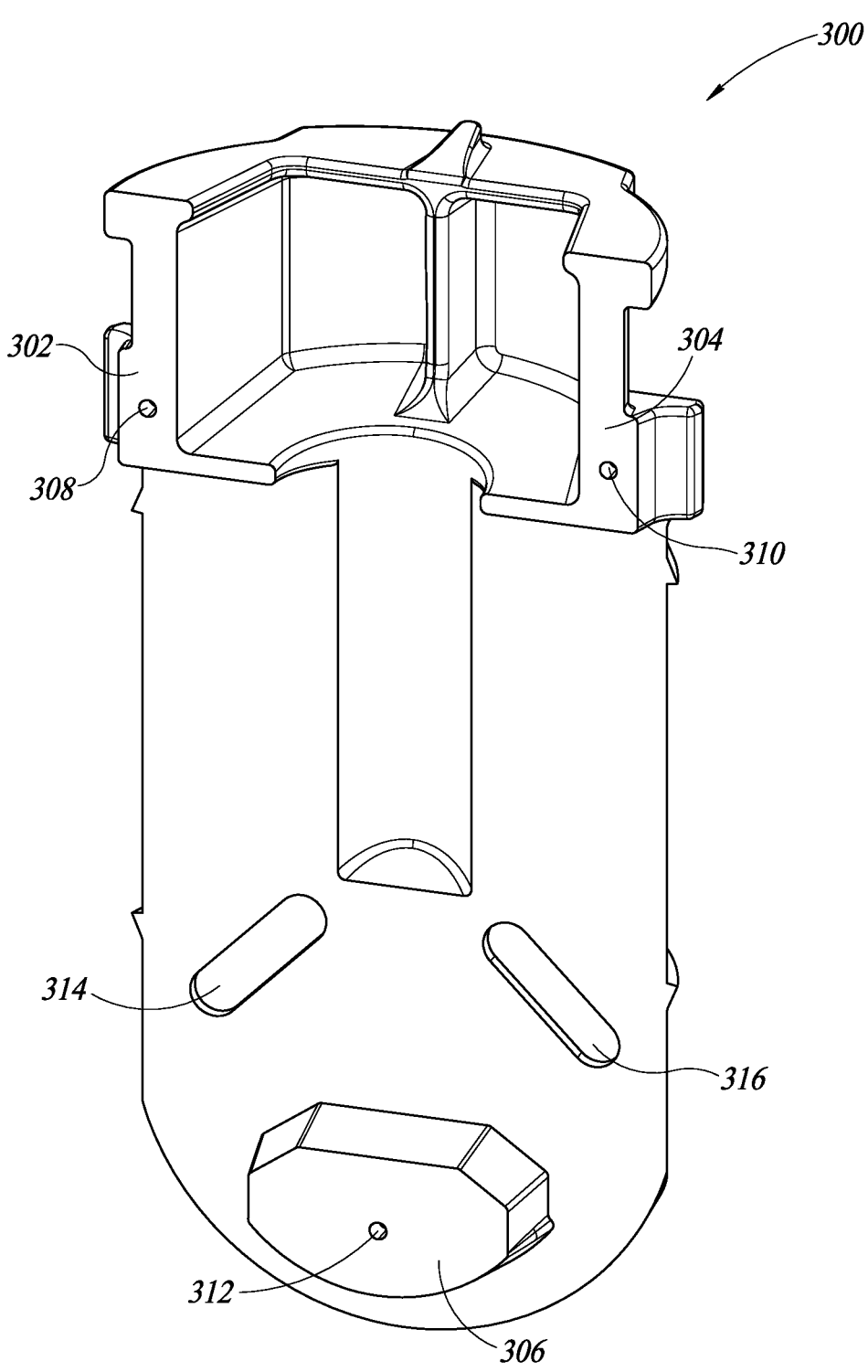
FIG. 24 illustrates a perspective view of a portion of a housing of the valve gate of FIG. 21.

FIG. 24 illustrates the downstream portion of a housing 300 by itself and shows that the downstream portion of the housing 300 includes a first protrusion 302, a second protrusion 304, and a third protrusion 306, where each of the protrusions 302, 304, and 306 extend inwardly and in an upstream direction from an inner or upstream surface of the downstream portion of the housing 300. The downstream portion of the housing 300 may be identical to, and/or a mirror image of, or substantially identical to and/or a substantial mirror image of, a corresponding upstream portion of the housing, such that the upstream portion of the housing includes protrusions identical to or mirror images of the protrusions 302, 304, and 306 that extend inwardly and in a downstream direction from an inner or downstream surface of the upstream portion of the housing. That is, the upstream portion of the housing can have any of the features described herein for the downstream portion of the housing 300. As illustrated in FIG. 24, the downstream portion of the housing 300 includes a first aperture 308 extending into the first protrusion 302, a second aperture 310 extending into the second protrusion 304, and a third aperture 312 extending into the third protrusion 306. Each of the apertures 308, 310, and 312 can be threaded, such that the downstream portion of the housing 300 can be coupled to the upstream portion of the housing by threaded fasteners (e.g., bolts, screws, etc.) extending through the respective apertures.

As illustrated in FIG. 24, when a valve gate is located within the pipeline 100 and the downstream portion of the housing 300 and the protrusions 302, 304, and 306 are viewed along the central longitudinal axis of the pipeline 100, the downstream portion of the housing 300 includes a first slot, track, guide, or groove 314 that extends diagonally, both along a first axis radial to both the central longitudinal axis of the pipeline 100 and the central longitudinal axis of the threaded rod 114, and along a second axis that is aligned with the central longitudinal axis of the threaded rod 114. While the groove 314 is illustrated as extending diagonally and linearly, in alternative embodiments, the groove 314 can have other profiles, such as curved (e.g., with a variable radius of curvature), J-shaped, or hockey stick-shaped profiles. The first slot or groove 314 is recessed into an upstream surface of the downstream portion of the housing 300 and extends from a first end thereof a first distance from the threaded rod 114 and a second distance from a proximal end of the threaded rod 114 to a second end thereof a third distance from the threaded rod 114 and a fourth distance from the proximal end of the threaded rod 114, where the first distance is less than the third distance and the second distance is less than the fourth distance. Thus, first and second wedges are formed in the upstream surface of the downstream portion of the housing 300 on opposing sides of the first slot or groove 314.

As further illustrated in FIG. 24, when a valve gate is located within the pipeline 100 and the downstream portion of the housing 300 and the protrusions 302, 304, and 306 are viewed along the central longitudinal axis of the pipeline 100, the downstream portion of the housing 300 includes a second slot, track, guide, or groove 316 that extends diagonally, both along a first axis radial to both the central longitudinal axis of the pipeline 100 and the central longitudinal axis of the threaded rod 114, and along a second axis that is aligned with the central longitudinal axis of the threaded rod 114. While the groove 316 is illustrated as extending diagonally and linearly, in alternative embodiments, the groove 314 can have other profiles, such as curved (e.g., with a variable radius of curvature), J-shaped, or hockey stick-shaped profiles. The second slot or groove 316 is recessed into an upstream surface of the downstream portion of the housing 300 and extends from a first end thereof a first distance from the threaded rod 114 and a second distance from the proximal end of the threaded rod 114 to a second end thereof a third distance from the threaded rod 114 and a fourth distance from the proximal end of the threaded rod 114, where the first distance is less than the third distance and the second distance is less than the fourth distance. Thus, third and fourth wedges are formed in the upstream surface of the downstream portion of the housing 300 on opposing sides of the second slot or groove 316. The downstream portion of the housing 300 may be symmetrical about a plane including both the central longitudinal axis of the pipeline 100 and the central longitudinal axis of the threaded rod 114. Thus, the first slot or groove 314 may be symmetrical to the second slot or groove 316 about such a plane.

Figure 25:
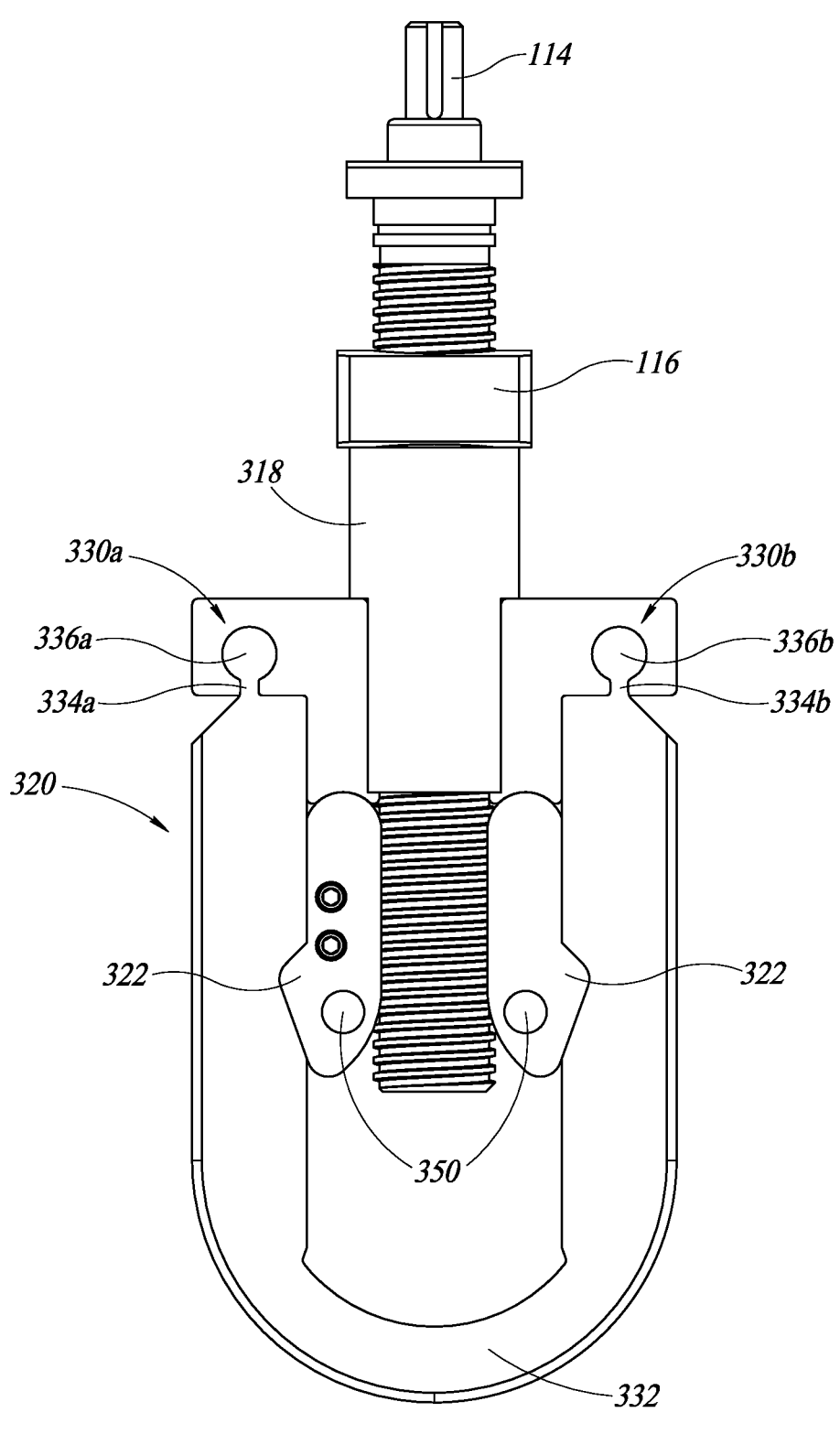
FIG. 25 illustrates a front view of components of the valve gate of FIG. 21.
Figure 26:
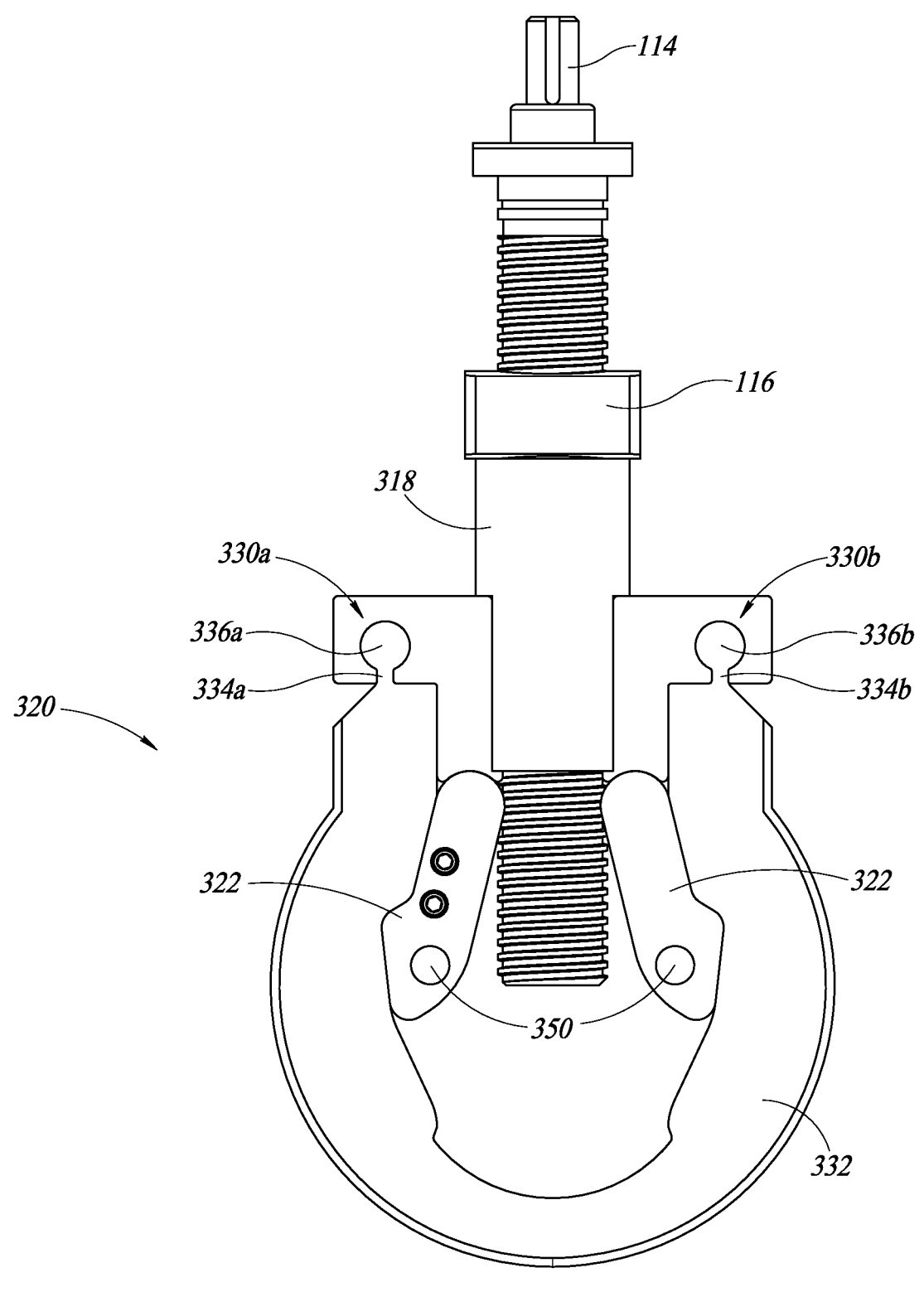
FIG. 26 illustrates a front view of components of the valve gate of FIG. 21, where the valve gate is in an expanded configuration.
Figure 27:
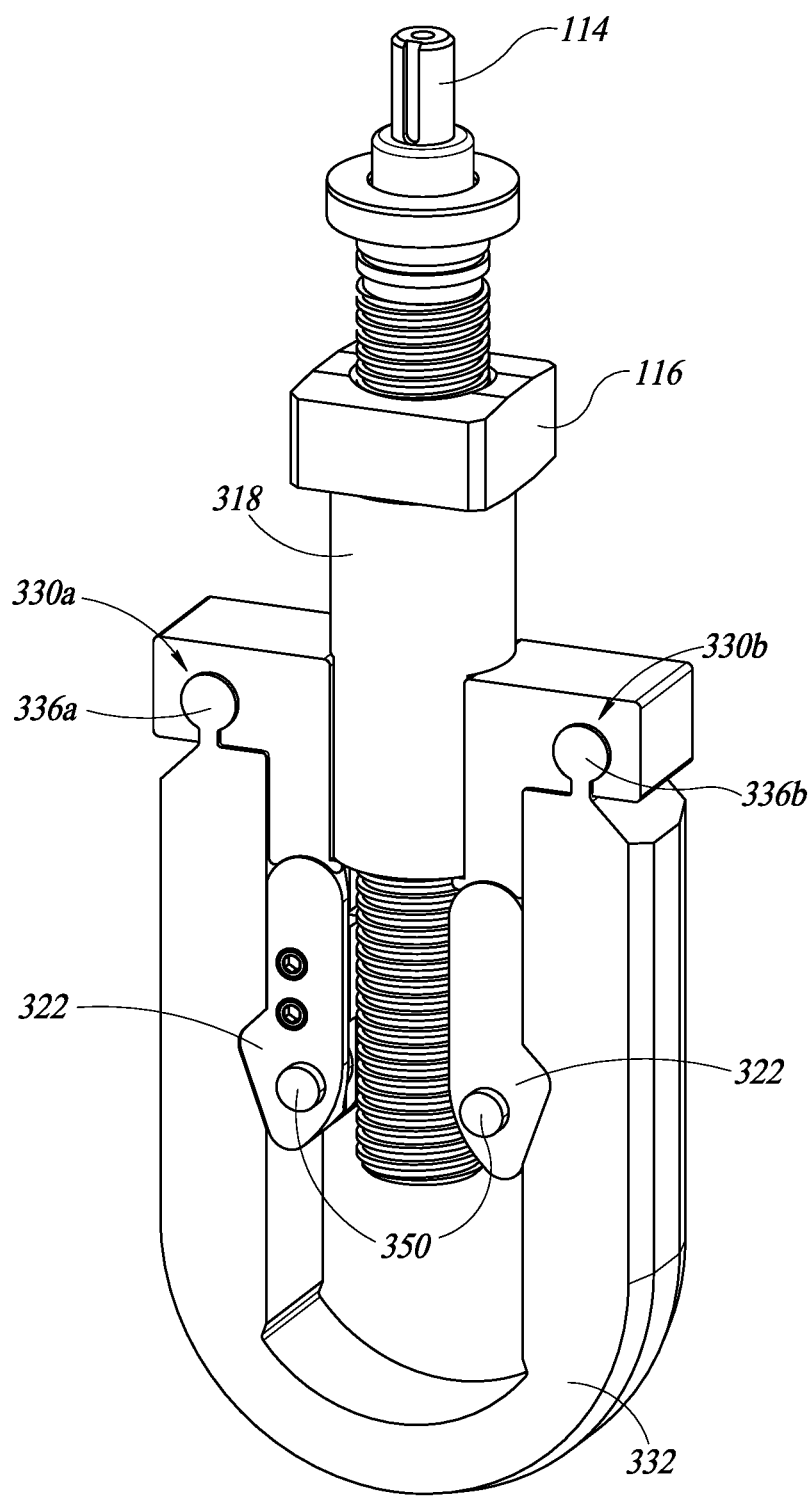
FIG. 27 illustrates an oblique view of components of the valve gate of FIG. 21.

FIG. 25 illustrates a front view of a valve gate with the upstream portion of the housing and the downstream portion of the housing 300 removed such that other features of the valve gate, such as of the threaded rod 114, the nut 116, a movable body 318, a seal 320, and a pair of levers 322, are shown. FIG. 26 illustrates a front view of the valve gate similar to that of FIG. 25, but in a radially-expanded configuration. FIG. 27 illustrates a view of the valve gate similar to that of FIG. 25, but from an oblique perspective. As illustrated in FIG. 27, both outermost corners of the seal 320 are chamfered. In particular, in a cross-section of the seal 320 taken at any location along the overall length of its main body 332, the two radially-outermost corners are chamfered.

The seal 320 has an overall shape matching that of the seal 220. In particular, the seal 320 has an outer shell providing its overall shape that is generally U-shaped, and includes a first end portion 330a, which forms a first terminal end of its overall U-shape, and a second end portion 330b, which forms a second terminal end of its overall U-shape. The seal 320 also includes an intermediate portion or main body 332 that extends longitudinally away from the first end portion 330a, curves to form a semi-circular curved intermediate or central portion thereof, and then extends longitudinally toward the second end portion 330b. The first end portion 330a includes a neck 334a coupled to an adjacent tapered portion of the main body 332 and a head, or a rail or shaft 336a that extends front-to-back when the valve gate 104 is assembled and viewed along the central longitudinal axis of the pipeline 100. Similarly, the second end portion 330b includes a neck 334b coupled to an adjacent tapered portion of the main body 332 and a head, or a rail or shaft 336b that extends front-to-back when the valve gate 104 is assembled and viewed along the central longitudinal axis of the pipeline 100. The seal 320 differs from the seal 220 in that it includes internal components housed within the outer shell providing its overall shape.

Figure 28:
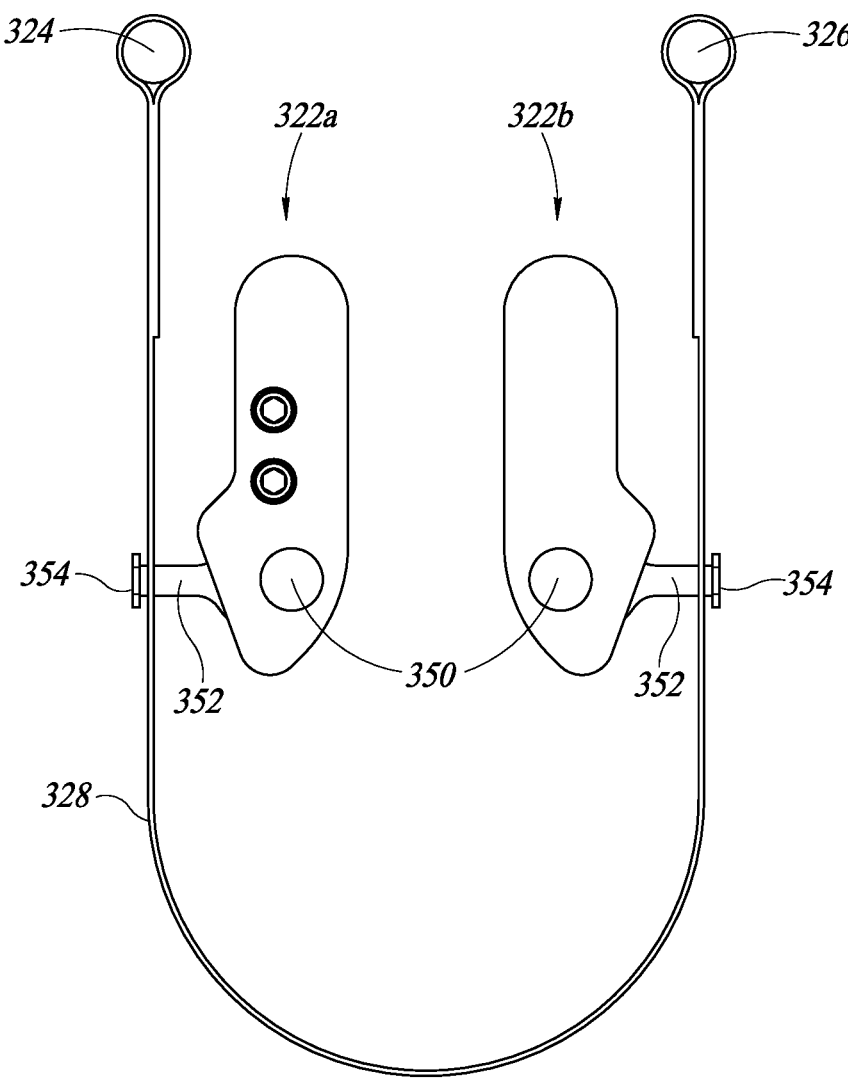
FIG. 28 illustrates another front view of components of the valve gate of FIG. 21.
Figure 29:
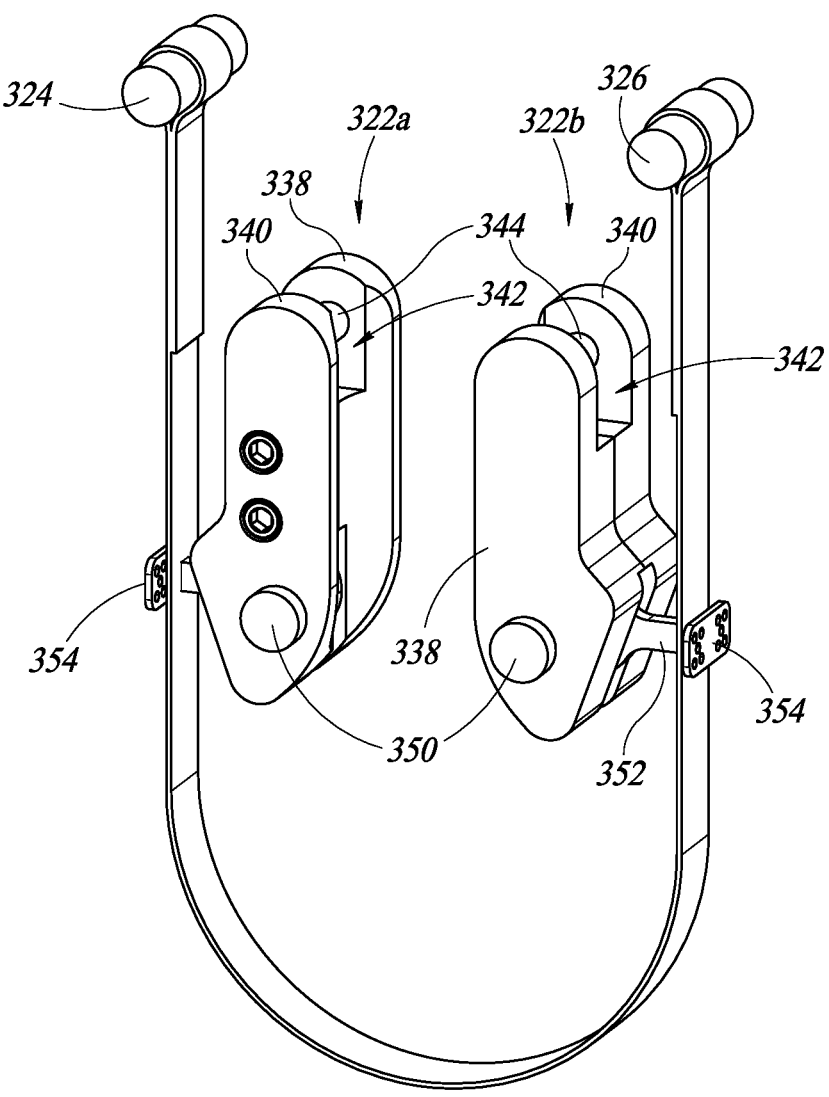
FIG. 29 illustrates a perspective view of the components of the valve gate illustrated in FIG. 28.
Figure 30:
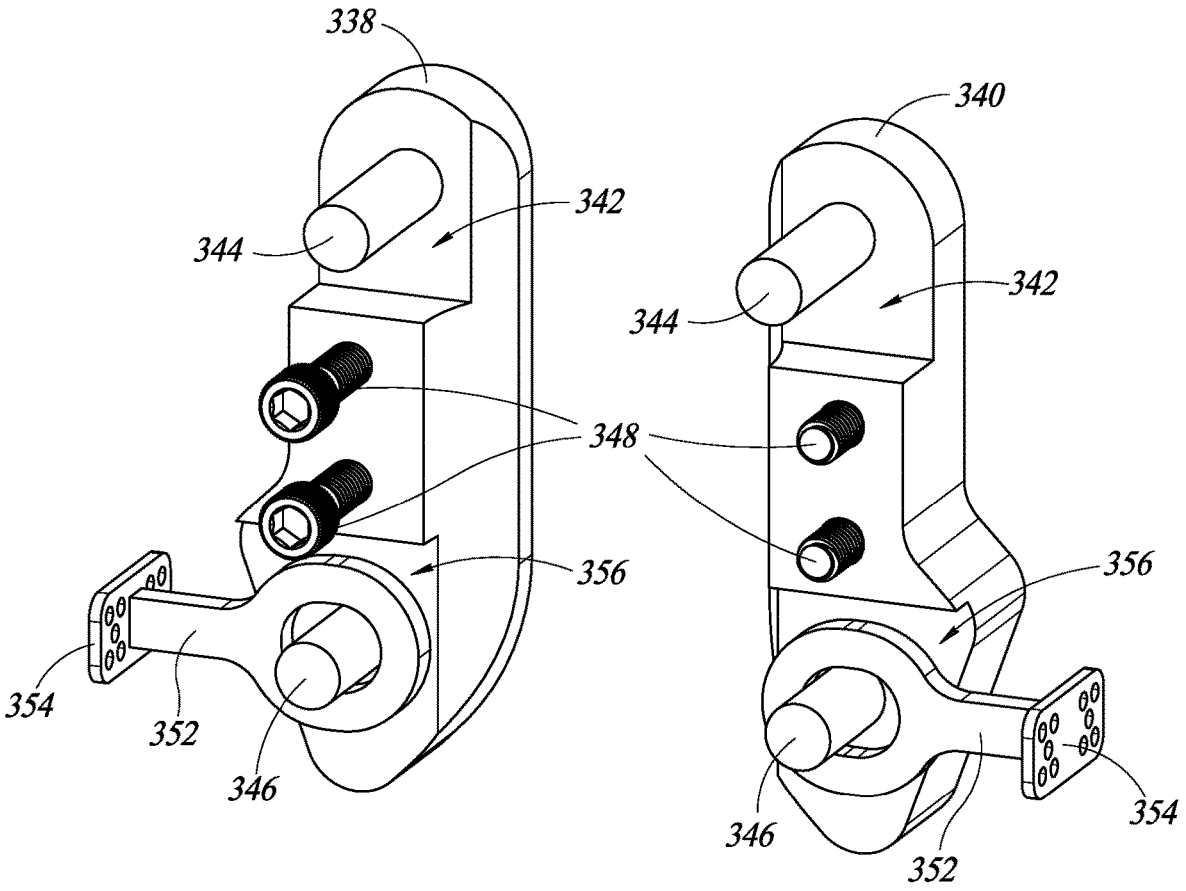
FIG. 30 illustrates a perspective view of some of the components of the valve gate, including levers thereof, illustrated in FIG. 29.

FIG. 28 illustrates such internal components of the seal 320, together with the pair of levers 322 and components that couple the internal components of the seal 320 to the pair of levers 322. FIG. 29 illustrates a perspective view of the components illustrated in FIG. 28, and FIG. 30 illustrates a perspective view of a subset of such components. As illustrated in FIGS. 28-30, the internal components of the seal 320 include a first rigid anchor rod or pin 324, a second rigid anchor rod or pin 326, and a strap, band, or belt 328. The first and second rigid anchor rods 324, 326 may be made of metal, such as steel. When a valve gate is assembled and located within the pipeline 100, the first rigid anchor rod 324 is located within the first shaft 336a at the first end portion 330a of the seal 320, which is located within a first undercut groove of the movable body 318, and the second rigid anchor rod 324 is located within the second shaft 336b at the second end portion 330b of the seal 320, which is located within a second undercut groove of the movable body 318. When a valve gate is assembled and located within the pipeline 100, the strap 328 wraps around the first rigid anchor rod 324, extends from the first shaft 336a of the seal 320, through the first neck portion 334a of the seal 320, through the U-shaped main body 332, through the second neck portion 334b of the seal, and to the second shaft 336b of the seal 320, where it wraps about the second rigid anchor rod 326.

The first and second rigid anchor rods 324, 326, may be made of stronger and more rigid material than the outer shell of the seal 320, and may have diameters larger than openings of the undercut grooves in the movable body 318, such that they can improve the resistance of the seal 320 to being pulled out of the undercut grooves in the movable body 318. The strap 328 may be made of a stronger material than the outer shell of the seal 320, which may experience less deformation under tensile loads than the outer shell of the seal 320, such that it can improve the resistance of the seal 320 to deformations along its length (that is, changes in its overall length). The strap 328 may have a higher tensile stiffness and/or a higher tensile strength than the outer shell of the seal 320. In some embodiments, the strap 328 may be made of a woven polyester. In some embodiments, the strap 328 may be replaced with a metal chain or other similar elongate component.

As further illustrated in FIGS. 28-30, the pair of levers 322 includes a first lever 322a and a second lever 322b, which may be identical to one another. The first and second levers 322a, 322b are positioned, arranged, and oriented such that they are separated from one another by a gap located between them, such that they are rotated by 180 degrees with respect to one another, and such that the levers 322a and 322b have 180 degree rotationally symmetry with respect to one another about the central longitudinal axis of the threaded rod 114. FIG. 30 in particular illustrates the pair of levers 322 with a front portion of a main body of each of the levers 322a and 322b removed to illustrate additional features. Because of the rotational symmetry of the pair of levers 322, FIG. 30 shows substantially all of the features of each of the levers 322a and 322b.

As illustrated in FIG. 30, each of the levers 322a and 322b has a main body including a first portion 338 of the main body and a second portion 340 of the main body. The first and second portions 338, 340 of the main bodies give the levers 322a and 322b their overall shapes, which can correspond to the overall shapes of the levers 130. Each of the first and second portions 338, 340 of the main bodies has a notch 342 cut into an inner surface thereof that faces toward the other of the first and second portions 338, 340 of the main bodies and at an end thereof to be seated within a socket of the movable body 318. Each of the levers 322a and 322b also includes a first axle 344 that extends from the first portion 338 of the main body thereof, through the notches 342 in the first and second portions 338, 340 of the main body thereof, and to the second portion 340 of the main body thereof. Each of the first axles 344 has a central longitudinal axis parallel to or aligned with the central longitudinal axis of the pipeline 100.

Each of the first and second portions 338, 340 of the main bodies also has a notch 356 cut into an inner surface thereof that faces toward the other of the first and second portions 338, 340 of the main bodies and at an end thereof opposite the first axle 344. Each of the levers 322a and 322b also includes a second axle 346 that extends from the first portion 338 of the main body thereof, through the notches 356 in the first and second portions 338, 340 of the main body thereof, and to the second portion 340 of the main body thereof. Each of the second axles 346 has a central longitudinal axis parallel to or aligned with the central longitudinal axis of the pipeline 100. Each of the levers 322a and 322b also includes a pair of threaded fasteners 348, which may be bolts or screws, that securely couple the first portion 338 of the main body thereof to the second portion 340 of the main body thereof. While the levers 322a and 322b are illustrated as including a pair of threaded fasteners 348, in alternative embodiments, the levers 322a and 322b may each include a single threaded fastener 348, three threaded fasteners, or four or more threaded fasteners 348. As illustrated in FIGS. 28 and 29, each of the first and second portions 338, 340 of the main bodies of each of the first and second levers 322a, 322b includes a protrusion 350 that extends outward from an outer surface thereof at an end of the respective lever 322 opposite to the respective first axle 344. Each of the protrusions 350 can be sized, shaped, and otherwise configured to sit in and ride through a respective one of the slots or grooves 314, 316 in the upstream portion of the housing and the downstream portion of the housing 300, such that the protrusions 350 can travel through the slots or protrusions 314, 316 and along the wedges formed thereby.

FIGS. 28-30 also illustrate components that couple each of the first and second levers 322a, 322b to the main body 332 of the seal 320 and specifically to the strap 328 thereof. In particular, for each of the first and second levers 322a, 322b, there is a fastener 352 having an eye portion and an elongate portion, where the eye portion is located within the notches 356 and extends around the second axle 346 of the respective lever 322 and where the elongate portion extends into the outer shell of the seal 320 and through the strap 328. A terminal end of the elongate portion of the fastener 352 distal from the eye portion thereof is coupled to (e.g., welded to) a retaining plate or flange 354, and which prevents the elongate portion of the fastener 352 from being pulled through the strap 328 or the strap 328 being pulled away from the fastener 352. In alternative embodiments, different components can be used to couple the first and second levers 322a, 322b to the main body 332 of the seal 320. For example, the main body 332 of the seal 320 may include loop-shaped projections that extend inward from either side of the overall U-shape of the seal 320. Such projections may be formed in the outer shell of the seal 320, and may be reinforced with eyebolts or straps, such as straps similar to the strap 328, located inside of the projections. Such loop-shaped projections may engage with complementary features of the levers 322a, 322b, such as the protrusions 350 or other protrusions similar to the protrusions 350, such as by positioning the loop-shaped projections so that they extend around the protrusions.

Figure 31:
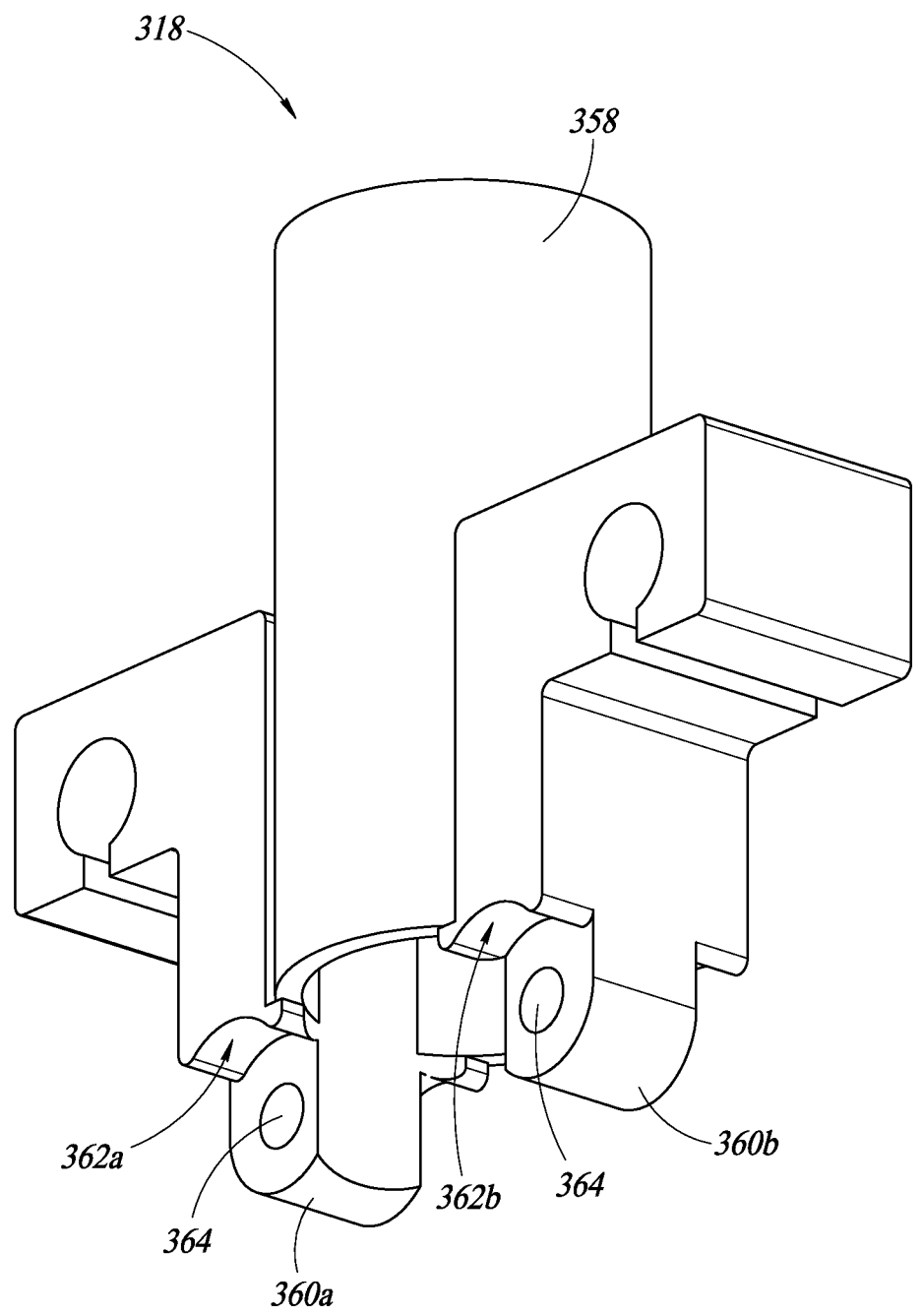
FIG. 31 illustrates a perspective view of a movable body illustrated in FIG. 25.

FIG. 31 illustrates the movable body 318 by itself such that additional features thereof are revealed. As illustrated in FIG. 31, the movable body 318 includes a hollow cylindrical body or spacer 358 that has a central longitudinal axis coincident with the central longitudinal axis of the threaded rod 114, and that is configured to extend around the threaded rod 114 such that the threaded rod 114 can extend through the spacer 358 without contacting the spacer 358. The movable body 318 also includes a first leg 360a that extends longitudinally away from a terminal end portion of the spacer 358 at a first side of the spacer 358 in a direction aligned with or parallel to the central longitudinal axis of the threaded rod 114, and a second leg 360b that extends longitudinally away from the terminal end portion of the spacer 358 at a second side of the spacer 358 opposite to the first side thereof in a direction aligned with or parallel to the central longitudinal axis of the threaded rod 114.

As illustrated in FIG. 31, terminal end portions of the first and second legs 360a and 360b distal from the spacer 358 include respective sockets 362a, 362b configured to receive end portions of the levers 322. In particular, each of the terminal end portions of the first and second legs 360a and 360b include a respective aperture, bore hole, or through hole 364 having a central longitudinal axis parallel to or aligned with the central longitudinal axis of the pipeline 100. Each of the apertures 364 is sized and configured to receive the first axles 344 of the levers 322, such that the levers 322 are mounted and rotatably secured to the movable body 318 by the first axles 344 being retained within the apertures 364. Thus, each of the sockets 362a, 362b can form a respective fulcrum for a respective one of the levers 322 when the valve gate is assembled and in use, as described further elsewhere herein.

To actuate and operate the valve gate, such as to move the valve gate into the pipeline 100 through the opening 110 and thereby begin to seal the pipeline 100, as described elsewhere herein, an operator can actuate the threaded rod 114 to rotate about its own central longitudinal axis by engaging other device(s) with the terminal end portion 144 of the threaded rod 114, including with the keyway 146 thereof. Actuating the threaded rod 114 to rotate about its own central longitudinal axis, as also described elsewhere herein, causes the nut 116 to travel along the length of the threaded rod 114 and its central longitudinal axis. Because the nut 116 abuts against a terminal end portion of the movable body 318 and the movable body 318 is free to move along the length of the threaded rod 114, causing the nut 116 to travel along the length of the threaded rod 114 also causes the movable body 318 to travel along the length of the threaded rod 114 and its central longitudinal axis.

While the valve gate is being moved into the pipeline 100 through the opening 110, and before a distal end of the valve gate comes into contact with a surface of the pipeline 100 opposite to the opening 110, causing movement of the movable body 318 along the length of the threaded rod 114 also causes the rest of the valve gate, including the seal 320, the levers 322, the upstream portion of the housing, and the downstream portion of the housing 300, to move along the length of the threaded rod 114 into the pipeline 100. Once the valve gate has been moved into the pipeline 100 through the opening 110 and the distal end of the valve gate comes into contact with the surface of the pipeline 100 opposite the opening 110, however, further distal movement of a distal portion of the seal 320, the upstream portion of the housing, and the downstream portion of the housing 300 is blocked or prevented by the engagement of the valve gate with the surface of the pipeline 100 opposite the opening 110.

Thus, at this stage, continued movement of the movable body 318 along the length of the threaded rod 114 causes the outer surfaces of the wedges formed by the slots or grooves 314, 316 to exert forces against the protrusions 350 of the levers 322, which, when combined with the engagement of the ends of the levers 322 with the sockets 362a, 362b, causes the levers 322 to pivot or rotate outward with respect to one another and with respect to the threaded rod 114 about their ends engaged with the sockets 362a, 362b. Such outward rotation of the levers 322, combined with the engagement of the outer surfaces of the levers 322 with the inner surface of the seal 320, causes the portions of the seal 320 engaged with the levers 322 to move outward, thereby causing the overall profile of the valve gate when viewed along the central longitudinal axis of the pipeline 100 to expand, such as to a profile that is larger than the opening 110 in the pipeline 100.

While the seal 320 is expanding radially outward with respect to the central longitudinal axis of the pipeline 100, and before the seal 320 fully engages with the inner surface of the pipeline 100 to form a complete seal therewith, continued movement of the movable body 318 along the length of the threaded rod 114 causes continued outward rotation of the levers 322 and continued expansion of the seal 320 radially outwards with respect to the central longitudinal axis of the pipeline 100. Once the seal 320 fully engages with the inner surface of the pipeline 100 and forms a complete seal therewith, however, further expansion of the seal 320 is blocked or prevented by the engagement of the seal 320 with the inner surface of the pipeline 100. At this stage, rotation of the threaded rod 114 can be ceased and the actuation of the valve gate to seal the pipeline 100 is complete. In this configuration, the valve gate is in an engaged, inserted, closed, and sealed position or configuration.

To actuate and operate the valve gate, such as to retract the valve gate by moving the valve gate out of the pipeline 100 through the opening 110, as described elsewhere herein, an operator can actuate the threaded rod 114 to rotate about its own central longitudinal axis by engaging other device(s) with the terminal end portion 144 of the threaded rod 114, including with the keyway 146 thereof, such that the threaded rod 114 rotates in a direction opposite to that used to insert the valve gate. Such rotation of the threaded rod 114 acts to move the components of the valve gate in directions opposite to those described above for the insertion of the valve gate. For example, in a first step, the seal 320 is retracted inward and the overall profile of the valve gate as viewed along the central longitudinal axis of the pipeline 100 decreases, such as to a profile that is smaller than the opening 110 in the pipeline 100. In such a first step, movement of the movable body 318 along the length of the threaded rod 114 causes the outer surfaces of the wedges formed by the slots or grooves 314, 316 to exert forces against the protrusions 350 of the levers 322, which, when combined with the engagement of the ends of the levers 322 with the sockets 362a, 362b, causes the levers 322 to pivot or rotate inward with respect to one another and with respect to the threaded rod 114 about their ends engaged with the sockets 362a, 362b. Furthermore, as the levers 322 are forced by their engagement with the wedges to pivot or rotate inward, the engagement of the levers 322 with the fasteners 352 and of the fasteners 352 with the retaining flanges 354 and thereby with the strap 328, pulls the strap 328 and the rest of the seal 320 inward toward the central longitudinal axis of the threaded rod 114. As another example, in a second step, the valve gate may be retracted from the pipeline 100 through the opening 110 therein. Such actions can be used to move the valve gate to a disengaged, retracted, withdrawn, open, and unsealed position or configuration. Inserting and retracting the valve gate to seal and unseal the pipeline 100 can be repeated as desired.

As described herein, the levers 130 and 322 rotate with respect to other components. In alternative embodiments, however, such rotation may be replaced by linear motion or by a combination of linear motion and rotation. Furthermore, in some embodiments, rotation and/or linear movement of the levers 130 and 322 may be proportionally related to movement of other components, such as of the movable body 318 along the length of the threaded rod 114, where such proportionality is either constant or variable across the range of motion of the levers 130 and/or 322.

One advantage of the valve gates described herein is that they are configured to seal a variety of different pipelines even if those pipelines have different inside diameters, or even if a pipeline to be sealed has a variable inside diameter or an inside diameter that is not precisely known. In particular, because the valve gates described herein create a seal by expanding radially outward until they engage with an inner surface of the pipeline, the valve gates described herein can be expanded by an amount tailored to the specific inner diameter of the pipeline to be sealed, and even to the specific inner diameter at the specific location at which the pipeline is to be sealed.

For example, a single one of the valve gates described herein may be capable of sealing pipelines having inner diameters that range over at least one eighth of an inch, one quarter of an inch, or three eighths of an inch, such as without any changes made to the valve gate itself other than different amounts of expansion applied to the seal thereof. Furthermore, the valve gates described herein may be configured to seal pipelines having inner diameters between three inches and five inches, between five inches and seven inches, between seven inches and nine inches, between nine inches and eleven inches, between eleven inches and thirteen inches, between thirteen inches and fifteen inches, between fifteen inches and seventeen inches, between seventeen inches and nineteen inches, between nineteen inches and twenty one inches, between twenty one inches and twenty three inches, or between twenty three inches and twenty five inches.

The valve gates described herein have been described primarily in the context of live pipeline valve insertion, but the valve gates described herein can also be used in installed-in-place valves or valves that are initially installed in new pipeline systems, such as within a traditional wedge-style gate valve. In such embodiments, certain differences from the preceding description would apply. For example, in such embodiments, the valve gate may be oriented at 90 degrees with respect to the pipeline to be sealed as compared to its orientation with respect to the pipeline 100 illustrated and described above with respect to live pipeline valve insertion. Thus, in such embodiments, the valve gate may be configured such that an axis along which the seal of the valve gate expands is aligned with or parallel to a central longitudinal axis of the pipeline to be sealed, and/or such the valve gate may be configured to form a seal with at least a portion of an axially-facing end surface of the pipeline to be sealed. Furthermore, in such embodiments, a valve including the valve gate may also include a valve seat such that the terminal distal end of the valve gate engages with the valve seat when the valve is closed.

U.S. provisional patent application No. 63/003,038, filed Mar. 31, 2020, and PCT application no. PCT/US21/24964, filed Mar. 30, 2021, are hereby incorporated herein by reference, in their entireties. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A valve gate, comprising:
a seal including an outer shell and an inner strap, wherein the inner strap is surrounded by the outer shell and the inner strap has a higher tensile stiffness or a higher tensile strength than the outer shell;
a rod having a central longitudinal axis, a proximal end along the central longitudinal axis, and a distal end opposite the proximal end along the central longitudinal axis;
a movable body coupled to the rod such that the movable body can move along a length of the rod; and
a lever located between the rod and the seal and engaged with the movable body and a portion of the seal such that movement of the movable body along the length of the rod drives the lever to rotate and push the portion of the seal outward away from the rod in a direction transverse to the central longitudinal axis,
wherein the seal has a first end coupled to the movable body, a second end opposite the first end coupled to the movable body, and an intermediate portion between the first and second ends that wraps around a distal end of the valve gate, and wherein the inner strap extends from the first end of the seal, through the intermediate portion of the seal, to the second end of the seal, and wherein the movable body includes a first undercut groove and a second undercut groove, wherein the outer shell of the seal includes a first hollow shaft at the first end of the seal and a second hollow shaft at the second end of the seal, wherein the first hollow shaft is securely retained within the first undercut groove of the movable body, and wherein the second hollow shaft is securely retained within the second undercut groove of the movable body.

2. The valve gate of claim 1 wherein the seal includes a first pin and a second pin, wherein the first pin is located within the first hollow shaft of the outer shell of the seal, wherein
the second pin is located within the second hollow shaft of the outer shell of the seal, and wherein the first and second pins are more rigid than the outer shell of the seal.

3. The valve gate of claim 2 wherein a first end of the inner strap wraps around the first pin and a second end of the inner strap opposite the first end of the inner strap wraps around the second pin.

4. The valve gate of claim 2 wherein the first pin has a first diameter larger than an opening of the first undercut groove and the second pin has a second diameter larger than an opening of the second undercut groove.

5. A valve gate, comprising:
a rod having a central longitudinal axis, a proximal end along the central longitudinal axis, and a distal end opposite the proximal end along the central longitudinal axis;
a movable body coupled to the rod such that the movable body can move along a length of the rod;
a seal;
a housing component that has an internal surface that faces toward the rod, the movable body, and the seal, wherein the internal surface of the housing component includes a guide; and
a lever located between the rod and the seal and engaged with the movable body, the guide, and a portion of the seal such that movement of the movable body in a first direction along the length of the rod drives the lever to move and push the portion of the seal outward away from the rod in a direction transverse to the central longitudinal axis, and such that movement of the movable body in a second direction opposite to the first direction drives the lever to move and pull the portion of the seal inward toward the rod in the direction transverse to the central longitudinal axis,
wherein the guide is configured to guide motion of at least a portion of the lever, and
wherein the valve gate is configured to include one of:
the guide including a groove and the lever including a protrusion seated within the groove; and
the lever including a groove and the guide including a protrusion seated within the groove.

6. The valve gate of claim 5 wherein the lever is engaged with the movable body at a first end of the lever and the protrusion is located at a second end of the lever opposite to the first end of the lever.

7. The valve gate of claim 5 wherein the housing component includes a first wedge engaged with the lever and a second wedge engaged with the lever, wherein the first and second wedges are formed by the guide, and wherein the first and second wedges are separated by the guide.

8. The valve gate of claim 5 wherein the guide extends from a first end of the guide a first distance from the rod and a second distance from the proximal end of the rod to a second end of the guide a third distance from the rod and a fourth distance from the proximal end of the rod, where the first distance is less than the third distance and the second distance is less than the fourth distance.

9. The valve gate of claim 5 wherein the lever is directly connected to the seal.

10. The valve gate of claim 9 wherein the seal includes an outer shell and an inner strap, wherein the inner strap is surrounded by the outer shell and the inner strap has a higher tensile stiffness or a higher tensile strength than the outer shell, and wherein a fastener mechanically secures the lever to the inner strap of the seal.

11. A valve gate having a central longitudinal axis, a proximal end along the central longitudinal axis, and a distal end opposite the proximal end along the central longitudinal axis, the valve gate comprising:

a first housing portion including a first protrusion extending radially outward from an outer surface of the first housing portion with respect to the central longitudinal axis; and a second housing portion including a second protrusion extending radially outward from an outer surface of the second housing portion with respect to the central longitudinal axis;

wherein the valve gate is configured such that, when the valve gate is inserted through a tapping sleeve into a pipeline carrying a pressurized fluid, the pressurized fluid exerts a pressure against the first portion of the housing, thereby causing a radially-outermost end of at least one of the first and second protrusions to bear against an internal surface of the tapping sleeve, thereby restraining movement of the valve gate such that the pressure exerted against the first portion of the housing bends the valve gate about a location where the valve gate engages with the pipeline.

12. The valve gate of claim 11 wherein the valve gate is configured such that exertion of the pressure against the first housing portion causes a radially-outermost end of the first protrusion to bear against the internal surface of the tapping sleeve, thereby restraining movement of the valve gate such that the pressure exerted against the first housing portion bends the valve gate about a location where the second housing portion engages with the pipeline.

13. The valve gate of claim 11 wherein the first protrusion extends radially outward from a proximal-most end of the first housing portion and the second protrusion extends radially outward from a proximal-most end of the second housing portion.

14. The valve gate of claim 11 wherein the first protrusion extends radially outward from the outer surface of the first housing portion farther than any other component of the valve gate and the second protrusion extends radially outward from the outer surface of the second housing portion farther than any other component of the valve gate.

* * * * *